(12) United States Patent
Baba et al.

(10) Patent No.: US 8,514,458 B2
(45) Date of Patent: Aug. 20, 2013

(54) IMAGE OUTPUT APPARATUS AND IMAGE OUTPUT METHOD

(75) Inventors: Tatsuru Baba, Kawasaki (JP); Shigeki Hasui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 973 days.

(21) Appl. No.: 12/335,417

(22) Filed: Dec. 15, 2008

(65) Prior Publication Data

US 2009/0161155 A1 Jun. 25, 2009

(30) Foreign Application Priority Data

Dec. 21, 2007 (JP) ................................ 2007-330947

(51) Int. Cl.
*G06F 13/00* (2006.01)
*G06F 3/12* (2006.01)
*G06F 12/00* (2006.01)

(52) U.S. Cl.
USPC ........... 358/404; 711/100; 711/170; 711/171; 711/133; 711/159; 358/403; 358/1.1

(58) Field of Classification Search
CPC .......... H04N 1/32358; H04N 1/00222; H04N 2201/0094
USPC ......... 711/E12.006, 100, 147–150, 167–173; 358/1.11–1.18, 1.1, 400–404; 718/1, 100–108
See application file for complete search history.

(56) References Cited

U.S. PATENT DOCUMENTS

| | | | | |
|---|---|---|---|---|
| 5,999,709 A | * | 12/1999 | Fiala et al. | 358/1.15 |
| 6,348,974 B1 | * | 2/2002 | Takahashi et al. | 358/1.16 |
| 2004/0169885 A1 | * | 9/2004 | Mellor et al. | 358/1.16 |
| 2005/0063008 A1 | * | 3/2005 | Lea et al. | 358/1.16 |
| 2006/0087893 A1 | | 4/2006 | Nishihara et al. | |
| 2008/0231885 A1 | * | 9/2008 | Truong et al. | 358/1.15 |

FOREIGN PATENT DOCUMENTS

| | | |
|---|---|---|
| JP | 02291765 A | 12/1990 |
| JP | 10-308861 A | 11/1998 |
| JP | 10308861 A | 11/1998 |
| JP | 10337914 A | 12/1998 |
| JP | 2002077490 A | 3/2002 |
| JP | 2004229066 A | 8/2004 |
| JP | 2006-236304 A | 9/2006 |
| JP | 2007082144 A | 3/2007 |

* cited by examiner

*Primary Examiner* — Chad Dickerson
(74) *Attorney, Agent, or Firm* — Canon USA Inc IP Division

(57) ABSTRACT

An image output apparatus including a first storage unit and a second storage unit having a slower data access speed than the first storage unit, an input unit configured to input image data, a setting unit configured to set a threshold of remaining amount of the first storage unit, a detection unit configured to detect the remaining amount of the first storage unit in which the image data is stored, a determination unit configured to determine whether the remaining amount is smaller than the threshold, a control unit configured to control the storage units so that, when the determination unit determines the remaining amount is smaller than the threshold, image data which is smaller than the image data input by the input unit among the image data stored in the first storage unit is transferred to the second storage unit.

9 Claims, 32 Drawing Sheets

FIG.6
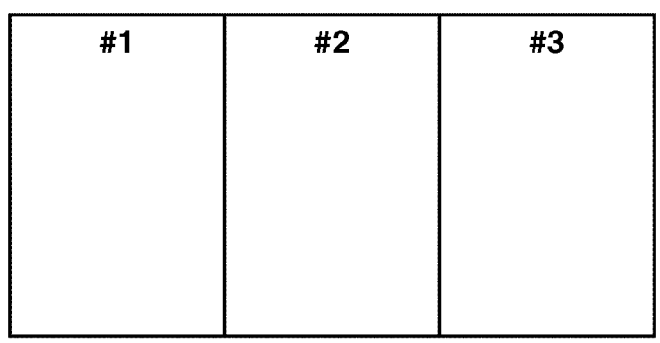
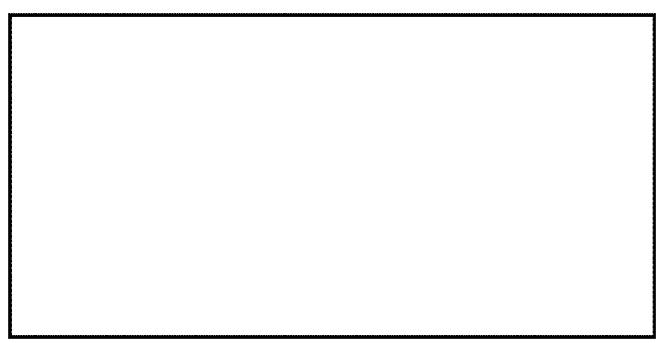

ID: Page ID
Addr: Start address
Size: Data size [Byte]
Pointer: Mem or HDD
Sts: Spool or Printed

FIG.13

MANAGEMENT TABLE 9000

| | | 9002 | 9003 | 9004 | |
|---|---|---|---|---|---|
| 9001 → | P1 | 0x3000_0000 | 2,000,000 | HDD | S ← 9005 |
| 9006 → | P2 | 0x1000_0000 | 3,000,000 | MEM | S ← 9010 |

| | | 9002 | 9000<br>MANAGEMENT TABLE | 9004 | | |
|---|---|---|---|---|---|---|
| 9001 | P1 | 0x0000_0000 | 3,000,000 | MEM | S | 9005 |
| 9006 | P2 | 0x1000_0000 | 1,000,000 | HDD | S | 9010 |
| 9011 | P3 | 0x1080_0000 | 2,000,000 | HDD | S | 9015 |
| | | 9007  9012 | 9003<br>  9013 | 9008  9009<br>  9014 | | |

FIG.19

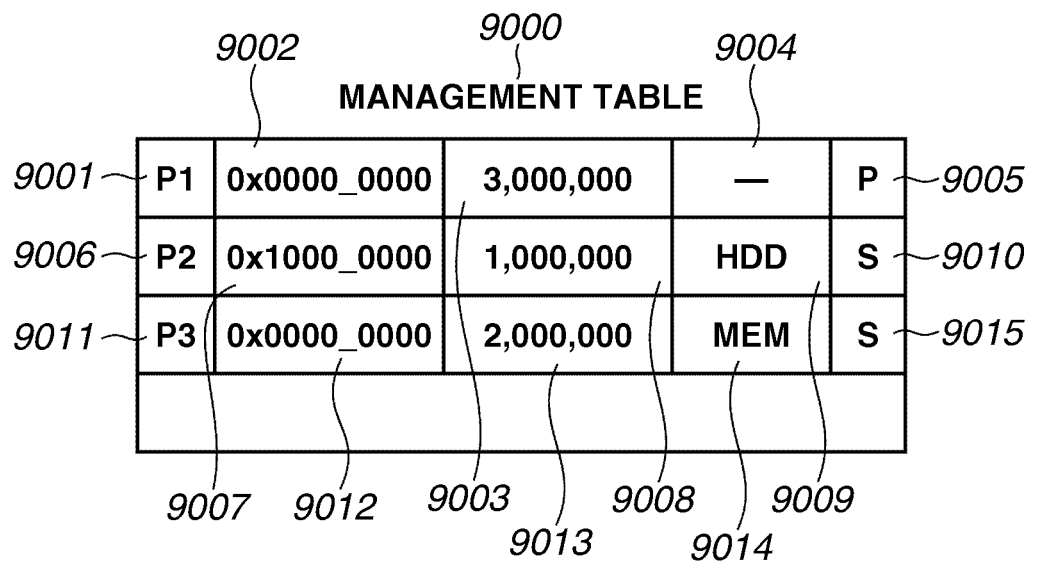

| | | | | | |
|---|---|---|---|---|---|
| P1 | 0x0000_0000 | 3,000,000 | — | P | |
| P2 | 0x1000_0000 | 1,000,000 | HDD | S | |
| P3 | 0x0000_0000 | 2,000,000 | MEM | S | |
| | | | | | |

MANAGEMENT TABLE (9000), 9001 P1, 9002, 9003, 9004, 9005 P, 9006 P2, 9007, 9008, 9009, 9010 S, 9011 P3, 9012, 9013, 9014, 9015 S

FIG.20
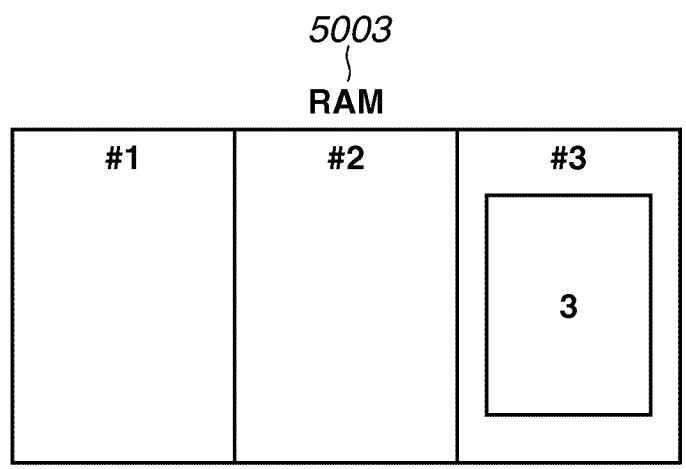
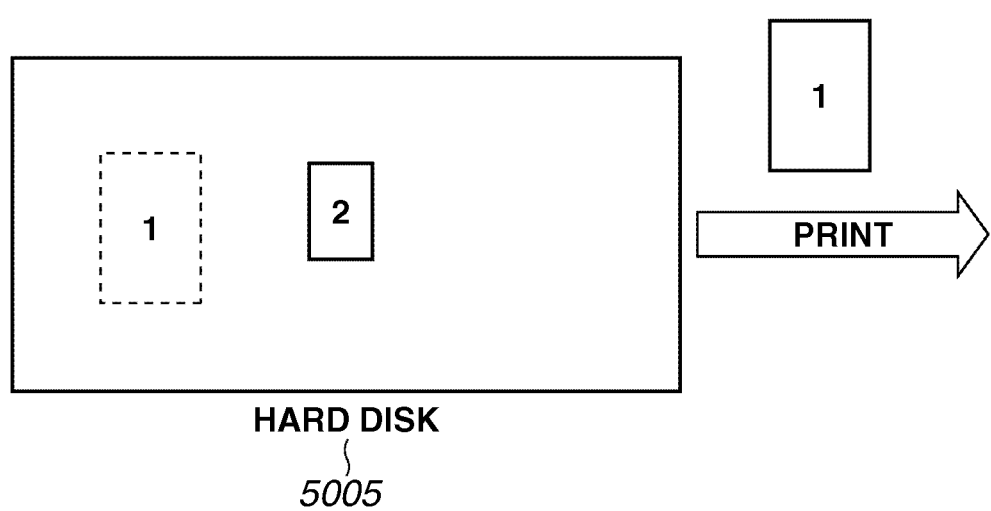

FIG.21

MANAGEMENT TABLE 9000

| | 9002 | | 9004 | |
|---|---|---|---|---|
| P1 | 0x1000_0000 | 2,000,000 | HDD | S |
| P2 | 0x1100_0000 | 1,000,000 | HDD | S |
| P3 | 0x2000_0000 | 3,000,000 | MEM | S |

9001 — P1 row
9006 — P2 row
9011 — P3 row
9005, 9010, 9015 — S column
9007, 9012 — address column
9003, 9013 — size column
9008, 9014 — type column
9009 — S column

FIG.22

MANAGEMENT TABLE

| | | | | |
|---|---|---|---|---|
| P1 | 0x1000_0000 | 2,000,000 | — | P |
| P2 | 0x1100_0000 | 1,000,000 | HDD | S |
| P3 | 0x2000_0000 | 3,000,000 | MEM | S |
| | | | | |

IMAGE OUTPUT APPARATUS AND IMAGE OUTPUT METHOD

BACKGROUND OF THE INVENTION

1. Field of the Invention

The present invention relates to an image output apparatus and an image output method.

2. Description of the Related Art

Recently, in image output apparatuses such as printers, since the data size of the processing target image data has been increasing, there has been a need to improve the processing speed of the image data. To improve the processing speed of the image data, it is necessary to improve the access speed to a recording medium, which is necessary during the image processing stage, as well as the image processing speed itself. This is because image output apparatuses temporarily store the image data during the processing stage of the image data in a recording medium such as a random access memory (RAM) or hard disk.

However, although in the image output apparatus a recording medium which has a large capacity and a fast access speed is required, this is often difficult due to cost restrictions. While volatile recording media, such as RAMs, have a fast access speed, such media are expensive due to their high cost per unit of data capacity. On the other hand, while non-volatile recording media, such as hard disks, can suppress cost increases due to their low cost per unit of data capacity, access speed is slow. Thus, in image output apparatuses, considering the balance between cost and access speed, image processing is performed using a plurality of recording media having different access speeds. Usually, a RAM is used as a work memory, and a hard disk is used as a storage memory. Especially in the case of printing processing, rasterized image data is temporarily held in the hard disk, then read to the RAM in series, and printed.

To improve the data processing speed by using a plurality of recording media having different access speeds, the following method has been proposed. Japanese Patent Application Laid-Open No. 2006-236304 discusses a method for bidirectionally moving data as necessary among different kinds of recording media. In this method, if the data to be accessed is held on a low-speed recording medium, actual access is performed on the data after it has been moved to a faster recording medium. If there is no longer any free space on the recording medium having a faster access speed, the data is moved to a recording medium having a slower access speed in order of older access history.

However, the method discussed in Japanese Patent Application Laid-Open No. 2006-236304 is a method directed to program data in a personal computer (PC). Since no consideration is given to the size of the data to be accessed in the recording medium or the processing order, it is difficult to achieve an increase in speed by applying the technology discussed in this document to an image output apparatus.

In image output apparatuses, image data of different data sizes is processed in page order. Thus, in an image output apparatus that uses a plurality of recording media having different access speeds, to achieve an increase in image data processing speed, it is necessary to control access to the recording media with consideration given to the data sizes of the image data and to the processing order.

SUMMARY OF THE INVENTION

The present invention is directed to an image output apparatus provided with a plurality of recording media having different access speeds, which can shorten the time required to output image data, by storing image data having a large data size in a recording medium having a fast access speed.

According to an aspect of the present invention, an image output apparatus includes a first storage unit and a second storage unit that has a slower data access speed than the first storage unit, and includes an input unit configured to input image data, a setting unit configured to set a threshold of remaining amount of the first storage unit, a detection unit configured to detect the remaining amount of the first storage unit in which the image data input by the input unit is stored in the first storage unit, a first determination unit configured to determine whether the remaining amount of the first storage unit detected by the detection unit is smaller than the threshold set by the setting unit, a control unit configured to control the first storage unit and the second storage unit so that, when the first determination unit determines that the remaining amount detected by the detection unit is smaller than the threshold set by the setting unit, image data which is smaller than the image data input by the input unit among the image data stored in the first storage unit is transferred to the second storage unit, and the image data input by the input unit is held in the first storage unit, and an output unit configured to read and output image data from the first storage unit or the second storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a configuration diagram of a RAM and a hard disk according to the first exemplary embodiment.

FIG. 13 is an image data management table of after the receiving processing of the second page image data in the receiving processing of image data in the multifunction peripheral according to the first exemplary embodiment.

FIG. 18 is an image data management table of before the printing processing of the first page image data in the printing processing of image data in the multifunction peripheral according to a second exemplary embodiment of the present invention.

FIG. 19 is an image data management table of after printing processing of first page image data in printing processing of image data in the multifunction peripheral according to the second exemplary embodiment.

FIG. 20 is a diagram illustrating the printing processing of the first page image data in the printing processing of image data in the multifunction peripheral according to the second exemplary embodiment.

FIG. 21 is an image data management table of before the printing processing of the first page image data in the printing processing of image data in the multifunction peripheral according to the second exemplary embodiment.

FIG. 22 is an image data management table of after the printing processing of the first page image data in the printing processing of image data in the multifunction peripheral according to the second exemplary embodiment.

DETAILED DESCRIPTION OF THE EMBODIMENTS

Various exemplary embodiments, features, and aspects of the invention will be described in detail below with reference to the drawings.

First, a configuration of an image output apparatus according to a first exemplary embodiment of the present invention will be described referring to FIGS. 1 to 7.

Figure 1:
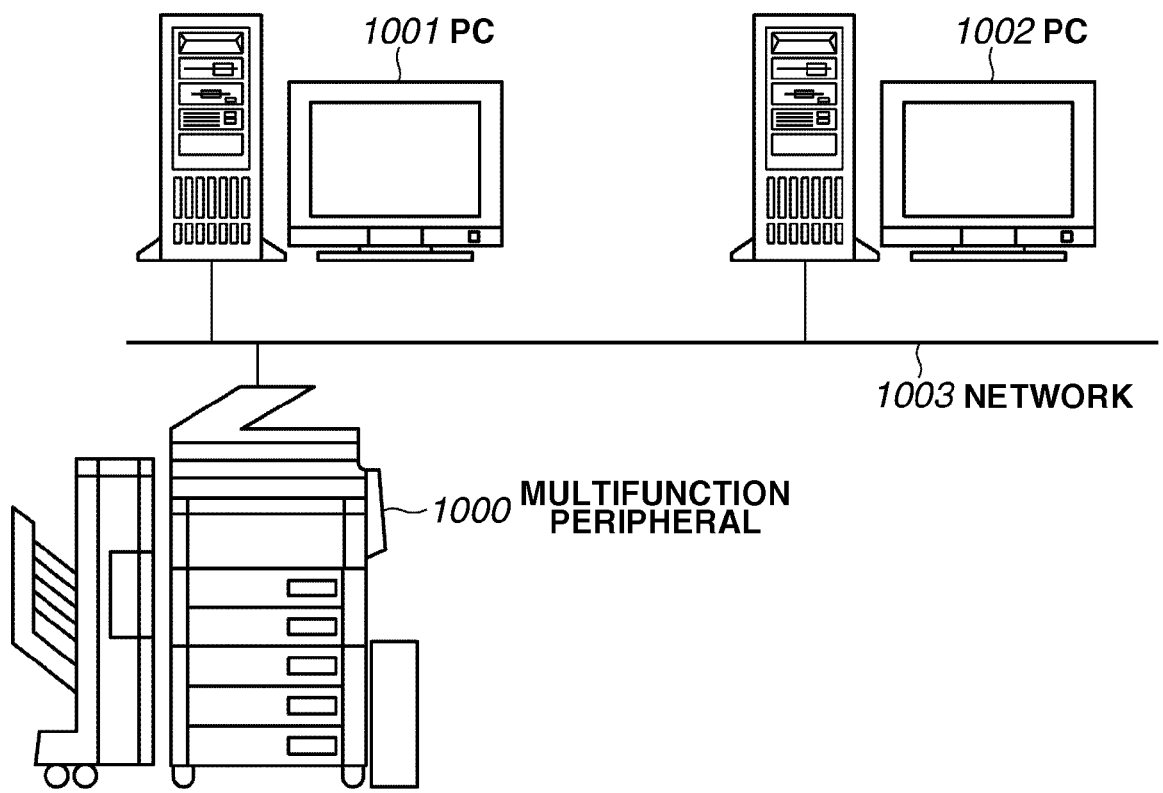
FIG. 1 is a configuration diagram of a system according to a first exemplary embodiment of the present invention.

FIG. 1 is a configuration diagram of a system according to the first exemplary embodiment. A multifunction peripheral 1000 is an image output apparatus that can perform image printing, reading etc. The multifunction peripheral 1000 is connected via a network 1003 to a PC 1001 and a PC 1002 used by users. The PC 1001 and the PC 1002 are personal computers, which send jobs (described below referring to FIG. 5) to the multifunction peripheral 1000. The multifunction peripheral 1000 receives jobs from the PC 1001 and the PC 1002, and performs data processing on the image data contained in the jobs. The network 1003 is a local area network realized by an Ethernet® etc.

Figure 2:
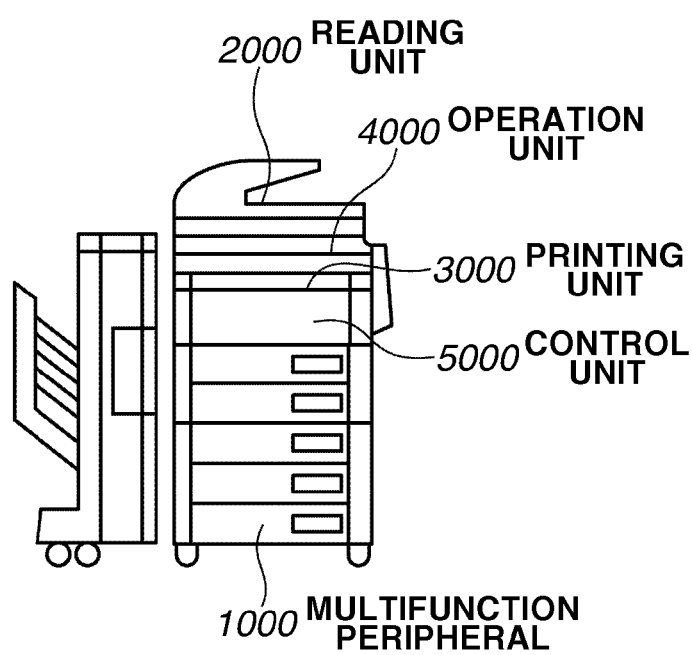
FIG. 2 is an external view of a multifunction peripheral according to the first exemplary embodiment.

FIG. 2 is an external view of the multifunction peripheral 1000 according to the first exemplary embodiment. A reading unit 2000 reads an original and converts it into image data. A printing unit 3000 prints the image data on a recording medium such as paper. An operation unit 4000 is configured from a display panel and an input button so that a user can operate the multifunction peripheral 1000. A control unit 5000 controls each of the multifunction peripheral 1000 operations.

Figure 3:
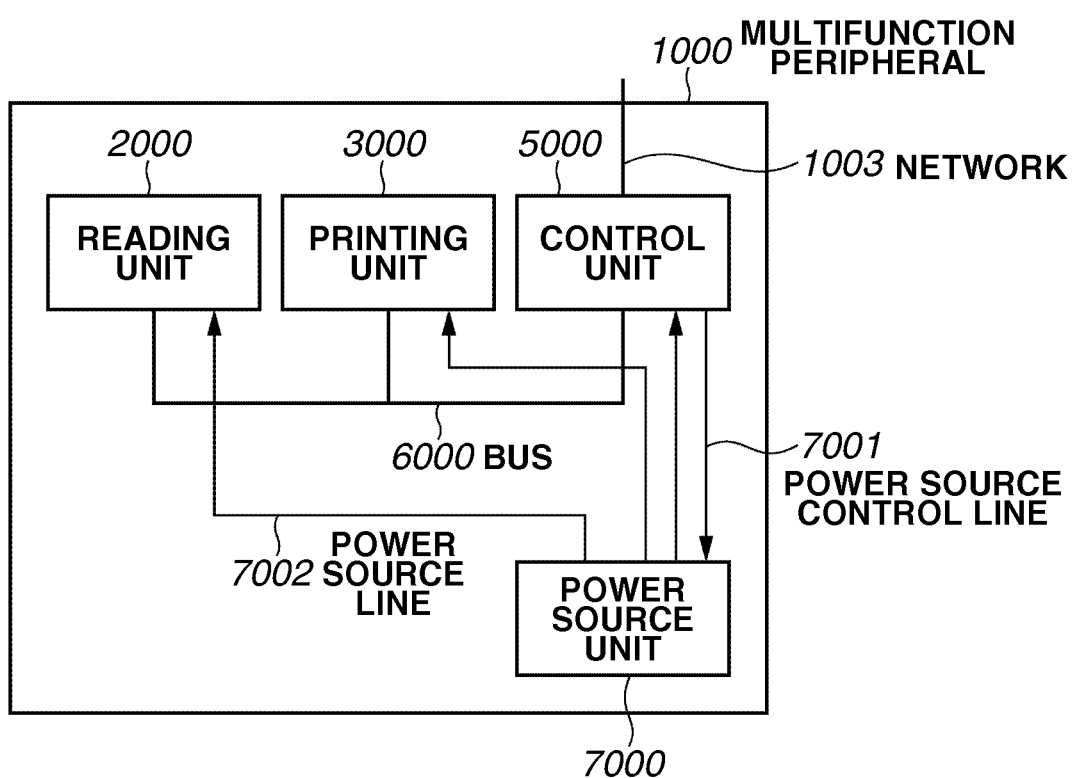
FIG. 3 is a function block diagram of the multifunction peripheral according to the first exemplary embodiment.

FIG. 3 is a function block diagram of the multifunction peripheral 1000 according to the first exemplary embodiment. The reading unit 2000, the printing unit 3000, and the control unit 5000 are interconnected via a bus 6000. In addition, in the multifunction peripheral 1000, a power source unit 7000 for supplying a power source to each of the blocks is present. The power source unit 7000 is controlled via a power source control line 7001 by the control unit 5000. The power source unit 7000 supplies power to the reading unit 2000, the printing unit 3000, and the control unit 5000 via a power source line 7002.

Figure 4:
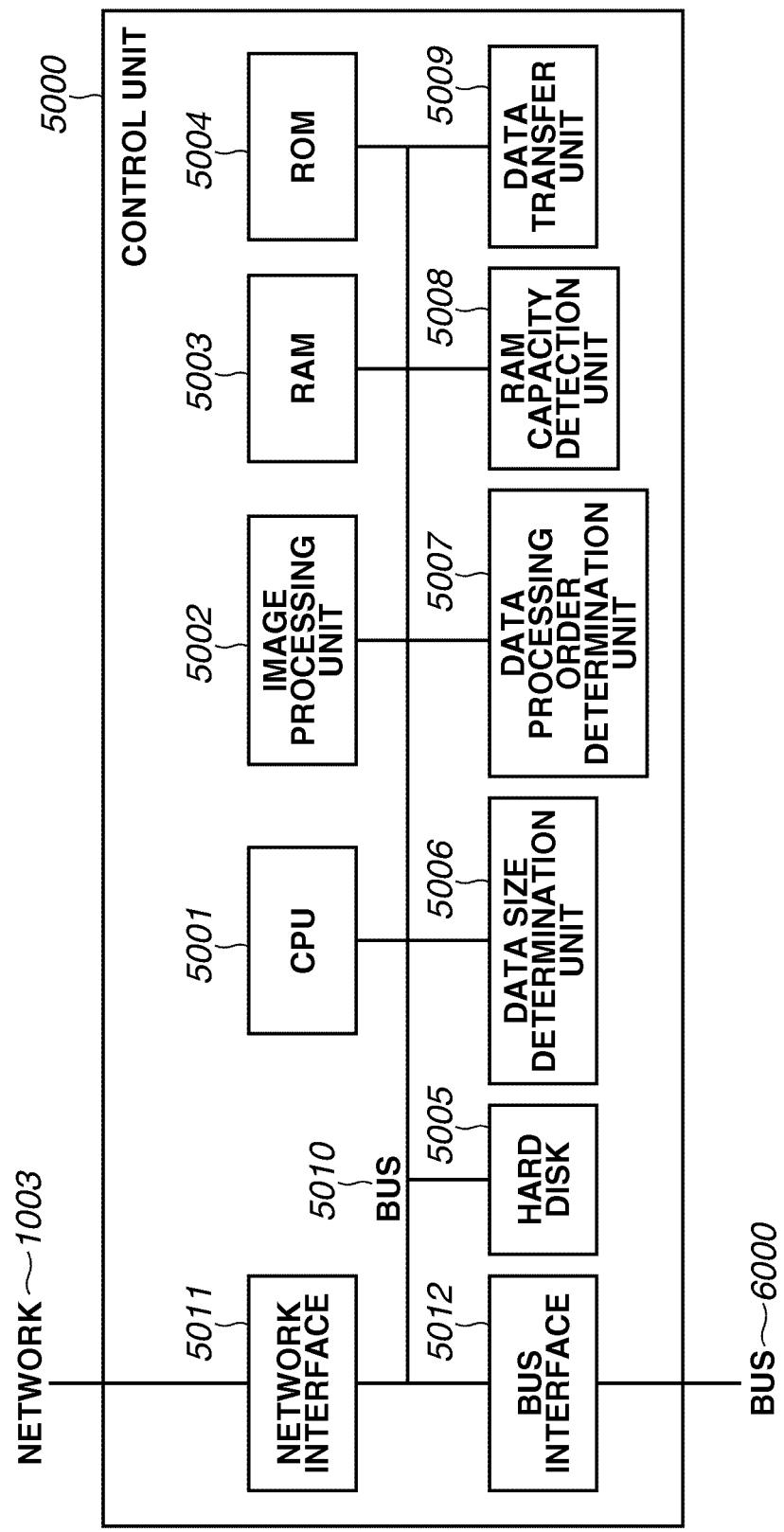
FIG. 4 is a function block diagram of a control unit of the multifunction peripheral according to the first exemplary embodiment.

FIG. 4 is a function block diagram of the control unit 5000 of the multifunction peripheral 1000 according to the first exemplary embodiment. A central processing unit (CPU) 5001 bears the central responsibility for controlling the multifunction peripheral 1000. An image processing unit 5002 performs image processing on the image data. Examples of the image processing executed by the image processing unit 5002 include rendering processing which renders image data contained in a job received by the multifunction peripheral 1000 into printable image data, expansion and reduction processing of the image data, and color conversion processing. A RAM 5003 is a volatile storage medium which stores image data etc. to be processed by the image processing unit 5002. Generally, the RAM 5003 has a faster data access speed but a smaller capacity than a hard disk 5005. A read only memory (ROM) 5004 stores programs that operate on the CPU 5001. The hard disk 5005 is a nonvolatile storage medium which stores programs which operate on the CPU 5001 and image data to be processed by the image processing unit 5002. Generally, the hard disk 5005 has a slower data access speed but a larger capacity than the RAM 5003. A data size determination unit 5006 determines the data size of image data to be processed in the control unit 5000. A data processing order determination unit 5007 determines the processing order of image data to be processed in the control unit 5000. A RAM capacity detection unit 5008 detects the remaining amount of the RAM 5003. A data transfer unit 5009 transfers image data in the control unit 5000. A bus 5010 connects each of the component units in the control unit 5000 to transfer data to each other. A bus interface 5012 is an interface between the bus 5010 and a bus 6000. A network interface 5011 is an interface between the bus 5010 and the network 1003.

Figure 5:
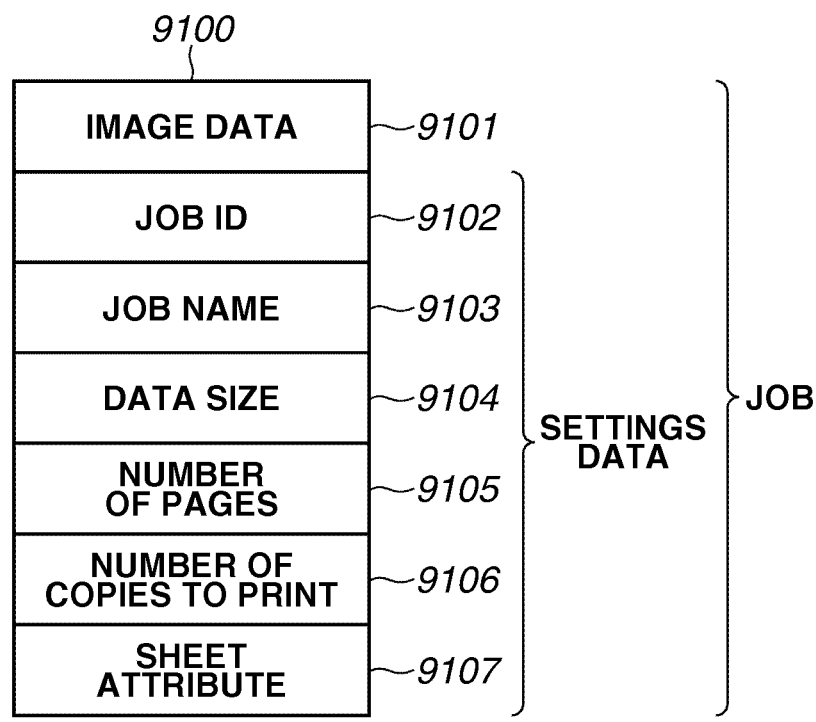
FIG. 5 is a configuration diagram of a job table according to the first exemplary embodiment.

FIG. 5 is a configuration diagram of a job table according to the first exemplary embodiment. In the present exemplary embodiment, a job 9100 is configured from image data 9101 to be printed, and settings data 9102 to 9107, which are used as the settings when printing the image data. The following are included in the settings data: job ID 9102 which is an identifier set for each job, job name 9103 which is a job name arbitrarily set by a user when producing the image data 9101, number of pages 9105 which is the total number of pages constituting the image data 9101, number of copies to print 9106 which is the number of copies to print when printing the image data 9101, and sheet attribute 9107 which is the size or type of the paper used when printing the image data 9101.

FIG. 6 is a configuration diagram of the RAM 5003 and the hard disk 5005 according to the first exemplary embodiment. FIG. 6 is used when describing the operations of the multifunction peripheral 1000. In the present exemplary embodiment, three buffers, which can hold one page worth of image data, are configured on the RAM 5003. However, a plurality of three or more buffers can be configured. Further, a configuration in which one buffer capable of holding a plurality of pages worth of image data is provided on the RAM 5003 will be described below in other exemplary embodiment. In the present exemplary embodiment, two buffers are used for receiving processing of the image data, and one buffer is used for the printing processing of the image data. The role allocation of the plurality of buffers can be configured in some other manner. Further, in the present exemplary embodiment, although the image data is processed in terms of page unit, the processing can also be performed for each of a plurality of units into which one page is divided. In addition, in FIG. 10 and subsequent figures, although a state is illustrated in which the image data is entered in the configuration diagrams of the RAM 5003 and the hard disk 5005, the size of the image data illustrated in the drawings at this stage corresponds to the data size of the image data.

Figure 7:
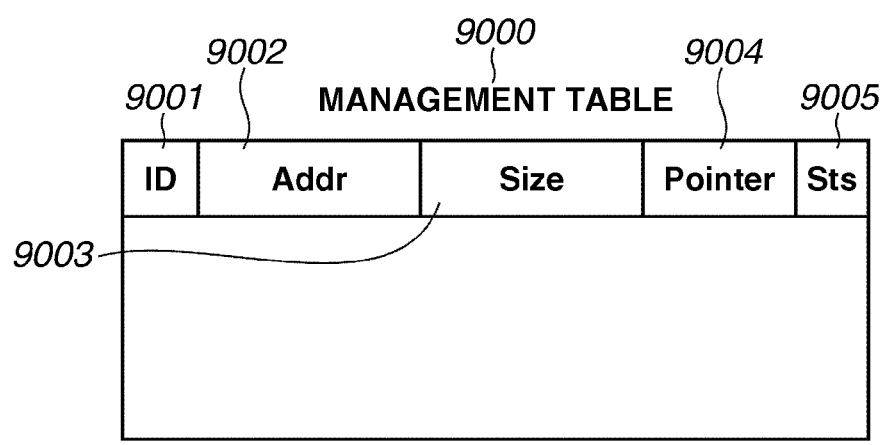
FIG. 7 is a configuration diagram of an image data management table according to the first exemplary embodiment.

FIG. 7 is a configuration diagram of an image data management table according to the first exemplary embodiment. FIG. 7 is used when describing the operations of the multifunction peripheral 1000. A management table 9000 is generated when the initial job after start-up of the multifunction peripheral 1000 is received. This management table 9000 is held in the RAM 5003. Further, a data transfer unit 5009 transfers the image data held in the RAM 5003 and the hard disk 5005, and then updates the management table 9000. Information stored in the management table 9000 is used, when the image data is output, as added information corresponding to the image data. ID 9001 indicates what page the image data is on. Start address 9002 indicates a start address in the storage medium in which the image data is held. Size 9003 indicates the data size of the image data. Pointer 9004 indicates whether the image data is held in the RAM 5003 or the hard disk 5005. In the Pointer 9004, MEM represents the RAM 5003, and HDD represents the hard disk 5005. Status 9005 indicates the state of the image data. In the Status 9005, S represents Spool (state where the image data has not undergone printing processing), and P represents Printed (state where the image data has undergone printing processing).

Next, referring to FIGS. 8 to 15, the operations of the multifunction peripheral 1000 according to the first exemplary embodiment will be described.

Figure 8:
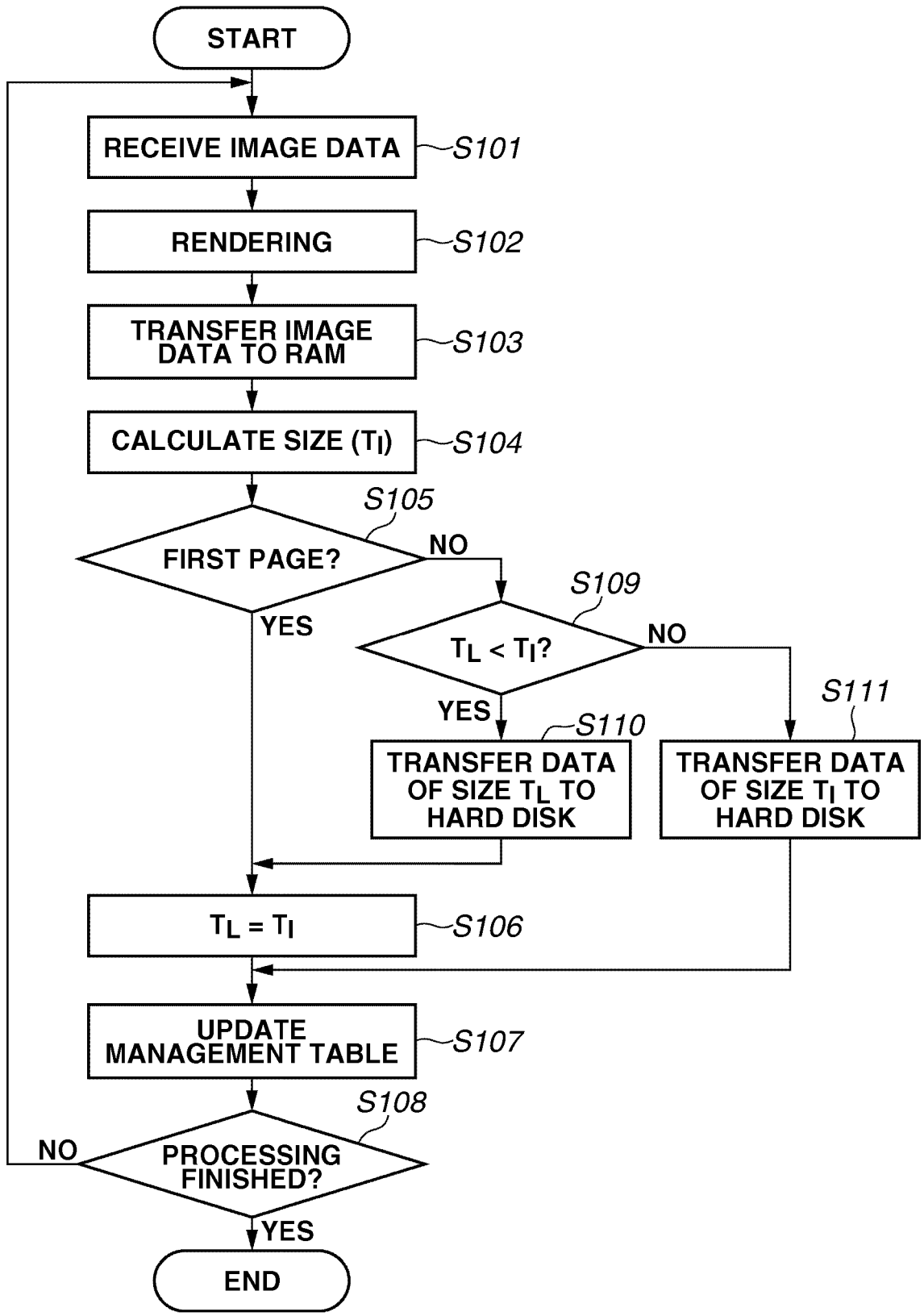
FIG. 8 is a flowchart illustrating receiving processing of image data in the multifunction peripheral according to the first exemplary embodiment.

FIG. 8 is a flowchart illustrating the receiving processing of a job in the multifunction peripheral 1000 according to the first exemplary embodiment of the present invention. In the multifunction peripheral 1000, the CPU 5001 realizes this processing by reading programs, which are stored in the hard disk 5005, and executing the programs on the RAM 5003.

First, in step S101, the CPU 5001 receives a job from the PC 1001 via the network 1003 by the network interface 5011. Next, in step S102, the image processing unit 5002 performs rendering processing on the image data contained in the job received in step S101. If in step S101 the job was received from the reading unit 2000, the rendering processing of step S102 is not performed. Next, in step S103, the data transfer unit 5009 transfers the image data, which has undergone the rendering processing in step S102, to the RAM 5003. Next, in step S104, the data size determination unit 5006 determines the data size TI of the image data transferred in step S103. Next, in step S105, if the image data transferred to the RAM 5003 in step S103 is first page image data (YES in step S105), the processing proceeds to step S106, while if the image data is second or subsequent page image data (NO in step S105), the processing proceeds to step S109.

Figure 10:
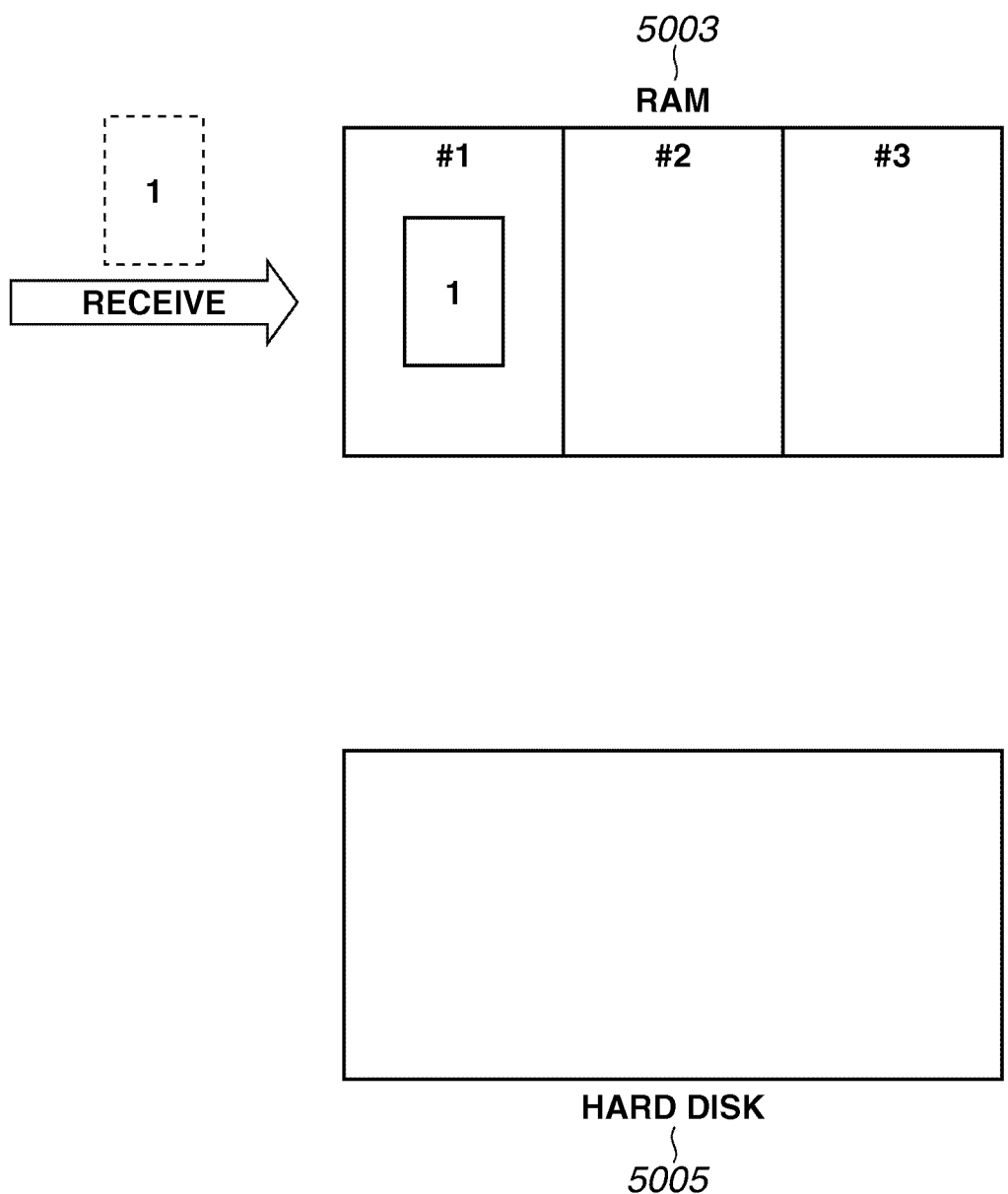
FIG. 10 is a diagram illustrating the receiving processing of first page image data in the receiving processing of image data in the multifunction peripheral according to the first exemplary embodiment.
Figure 11:
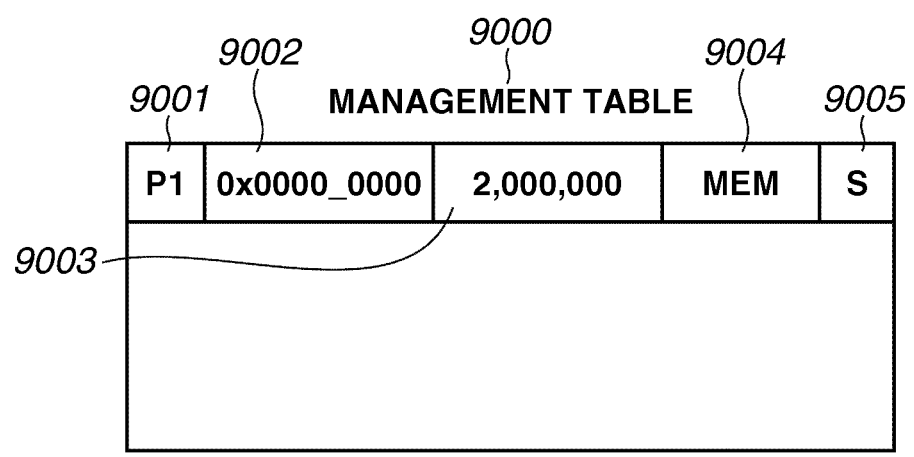
FIG. 11 is an image data management table of after the receiving processing of the first page image data in the receiving processing of image data in the multifunction peripheral according to the first exemplary embodiment.

In step S105, if the image data transferred to the RAM 5003 in step S103 is first page image data (YES in step S105), as illustrated in FIG. 10, the first page image data is held in the RAM 5003. At this stage, the following processing is performed. First, in step S106, the image data having a data size TI detected in step S104 is substituted with the image data having a data size TL that serves as a standard. Next, in step S107, the data transfer unit 5009 updates the information in the management table 9000. FIG. 11 is a diagram illustrating the image data management table 9000 after the first page image data is processed. In page ID 9001, P1, which is an ID indicating that the image data is of a first page, is registered. In start address 9002, the start address of the region in which the image data is held is registered. In data size 9003, 2 Mbytes, which is the data size of the first page, is registered. In pointer 9004, MEM, which represents RAM 5003, is registered as a pointer indicating the location where the first page image data is held. In status 9005, S (spool), which indicates a print waiting state as the status of the first page image data, is registered. Next, in step S108, if the image data which was updated in the management table 9000 in step S107 is not image data of a final page (NO in step S108), the processing returns to step S101, while if the image data was of the final page (YES in step S108), the processing is finished. Whether the image data is of the final page is determined by referring to the job information added to that image data (e.g., information indicating the total number of pages of the job, or information indicating what page that image data is) and the like.

In step S105, if the image data transferred to the RAM 5003 in step S103 is second or subsequent page image data (NO in step S105), the following processing is performed. First, in step S109, the control unit 5000 compares the data size TI of the image data detected in step S104 and the data size TL of the image data serving as a standard.

Figure 12:
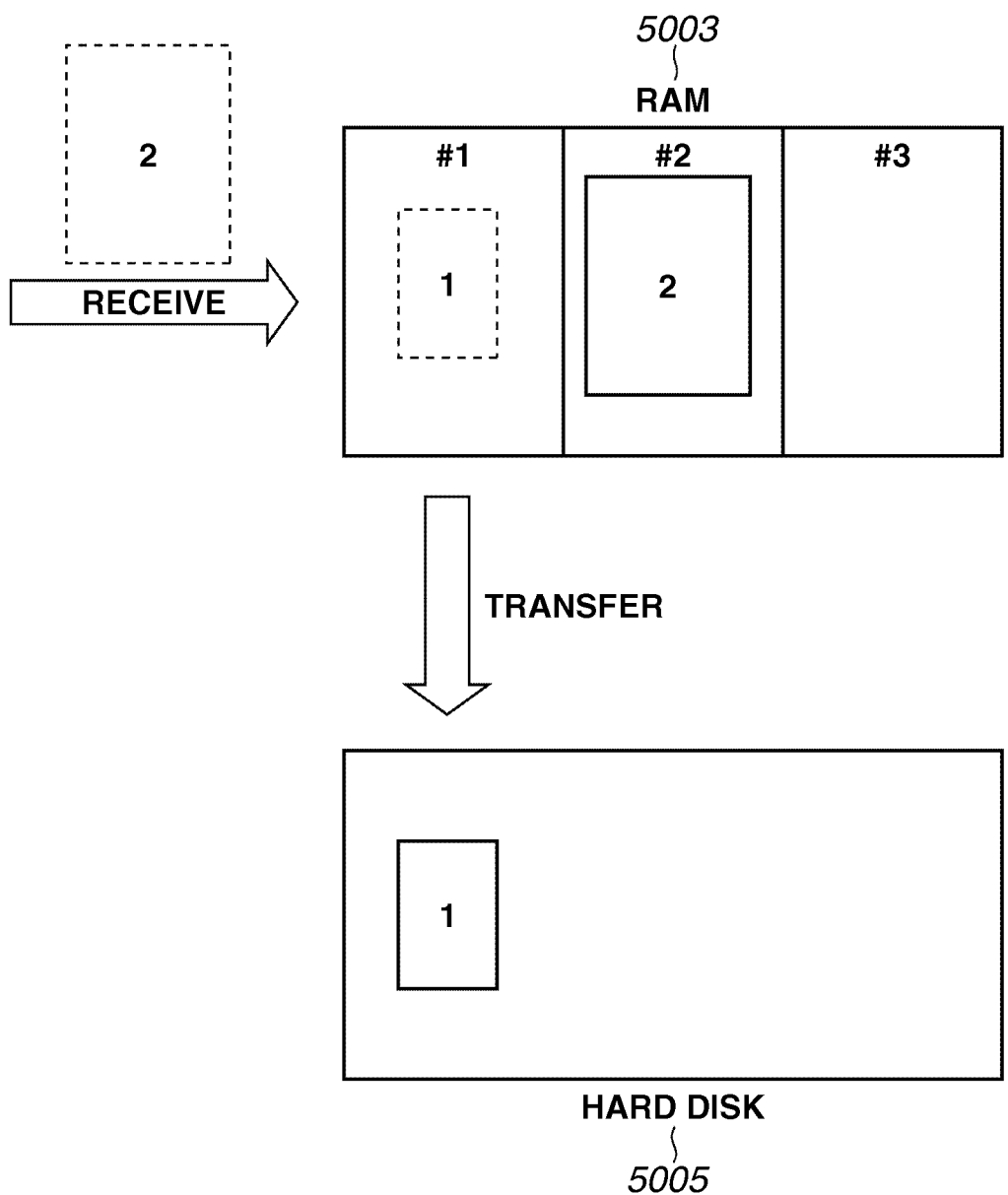
FIG. 12 is a diagram illustrating the receiving processing of second page image data in the receiving processing of image data in the multifunction peripheral according to the first exemplary embodiment.

In step S109, if TL<TI (YES in step S109), as illustrated in FIG. 12, the image data of data size TL (in FIG. 12, the first page) is transferred to the hard disk 5005, and the image data of data size TI is held in the RAM 5003 (in FIG. 12, the second page, #2). Then, the following processing is performed. First, in step S110, the data transfer unit 5009 transfers the image data of data size TL serving as a standard from the RAM 5003 to the hard disk 5005. Next, in step S106, data size T1, which is the data size of the compared image data, is substituted as data size TL, which will serve as a new standard. Next, in step S107, the data transfer unit 5009 updates the information in the management table 9000. FIG. 13 is a diagram which, if TL<TI (YES in step S109), illustrates the management table 9000 of the image data after the image data of data size TI (in FIG. 13, the second page) is processed. In page ID 9006, P2, which is a new ID indicating that the image data is of a second page, is registered. In start address 9007, the new start address 0x1000_0000, which indicate the location where the image data of the second page is held, is registered. In data size 9008, 3 Mbytes, which is the new data size of the second page, is registered. In pointer 9009, MEM, which represents RAM 5003, is registered as a pointer indicating the new location where the second page image data is held. In status 9010, S (spool), which indicates a print waiting state as the new status of the second page image data, is registered. Further, after adding information about the image data of the second page to the management table 9000, the data transfer unit 5009 transfers the first page image data to the hard disk 5005. In addition, the data transfer unit 5009 updates the data of the first page in the management table 9000. In detail, in FIG. 13, the start address 9002, which indicates the location in the hard disk 5005 where the first page image data is held, is updated to 0x3000_0000. Further, the pointer, which indicates the location where the first page image data is held in the hard disk 5005, is updated to HDD, which represents the hard disk 5005. Next, in step S108, if the image data which was updated in the management table 9000 in step S107 was not image data of the final page (NO in step S108), the processing returns to step S101, while if the image data was of the final page (YES in step S108), the processing is finished.

Figure 14:
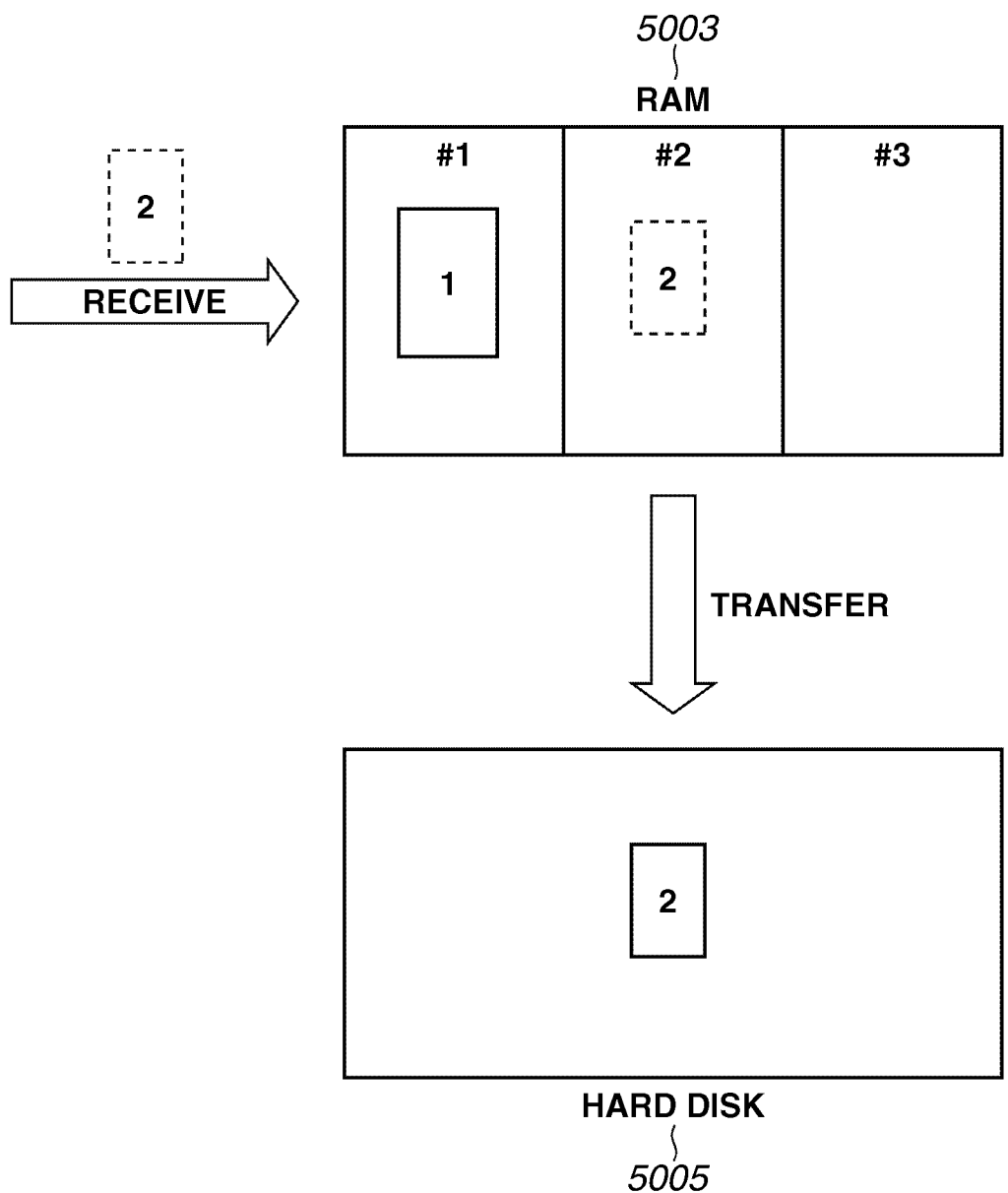
FIG. 14 is a diagram illustrating the receiving processing of the second page image data in the receiving processing of image data in the multifunction peripheral according to the first exemplary embodiment.
Figure 15:
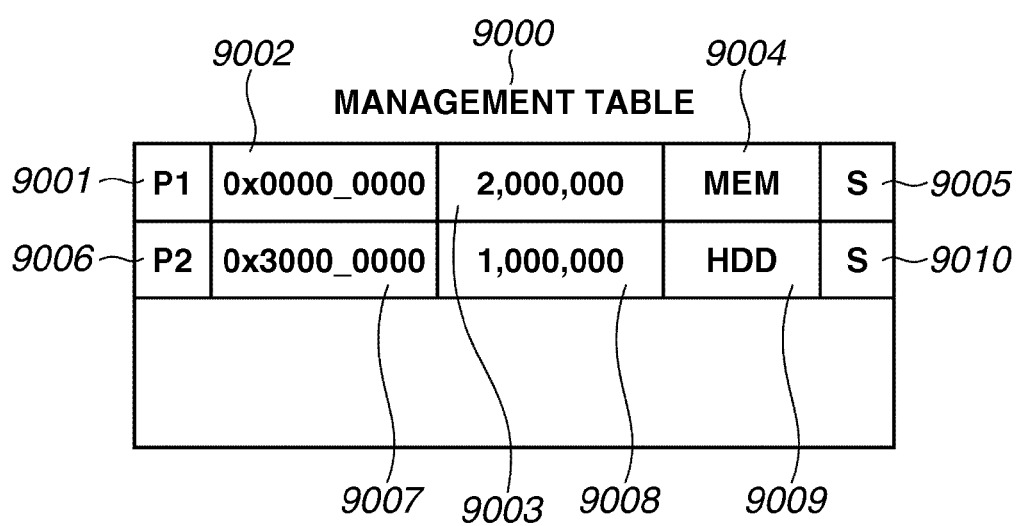
FIG. 15 is an image data management table of after the receiving processing of the second page image data in the receiving processing of image data in the multifunction peripheral according to the first exemplary embodiment.

In step S109, if TL is not less than TI (i.e., TL≧TI) (NO in step S109), as illustrated in FIG. 14, the image data of data size TI (in FIG. 14, the second page, #2) is transferred to the hard disk 5005, and the image data of data size TL (in FIG. 12, the first page, #1) is held in the RAM 5003. Then, the following processing is performed. First, in step S111, the data transfer unit 5009 transfers the image data of data size TI from the RAM 5003 to the hard disk 5005. Next, in step S107, the data transfer unit 5009 updates the information in the management table 9000. FIG. 15 is a diagram which, if TL is not less than TI (i.e., TL≧TI), illustrates the management table 9000 of the image data after the image data of data size TI (in FIG. 15, the second page, #2) is processed. In page ID 9006, P2, which is a new ID indicating the image data of a second page, is registered. In start address 9007, the new start address 0x3000 0000, which indicates the location where the image data of the second page is held, is registered. In data size 9008, 1 Mbyte, which is the new data size of the second page, is registered. In pointer 9009, HDD, which represents the hard disk 5005, is registered as a pointer indicating the new location where the second page image data is held. In status 9010, S (spool), which indicates a print waiting state as the new status of the second page image data, is registered. Next, in step S108, if the image data which was updated in the management table 9000, in step S107, is not image data of the final page (NO in step S108), the processing returns to step S101, while if the image data is of the final page (YES in step S108), the processing is finished.

Figure 9:
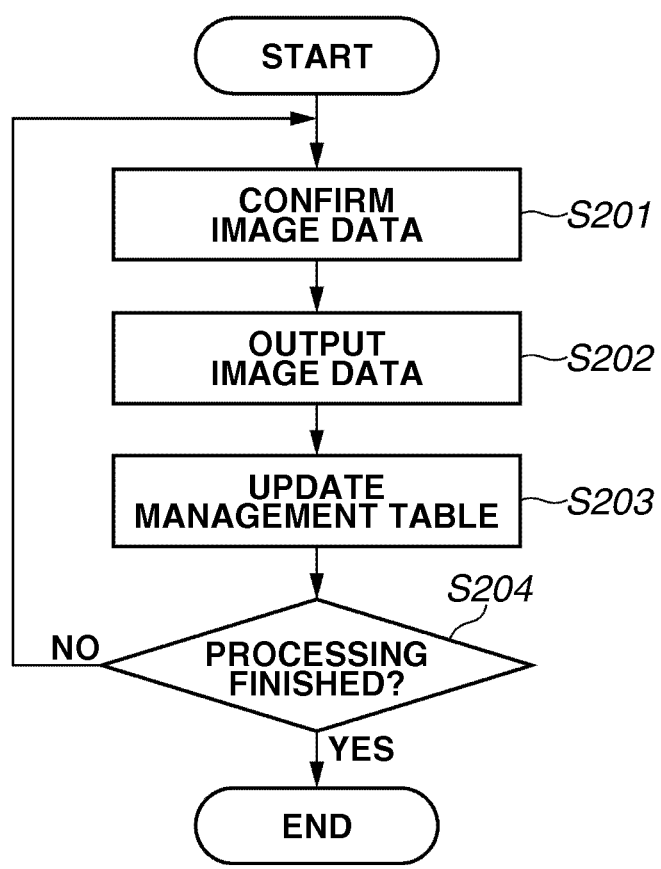
FIG. 9 is a flowchart illustrating printing processing of image data in the multifunction peripheral according to the first exemplary embodiment.

FIG. 9 is a flowchart illustrating the printing processing of the image data in the multifunction peripheral 1000 according to the first exemplary embodiment of the present invention. In the multifunction peripheral 1000, the CPU 5001 realizes this processing by reading programs stored in the hard disk 5005 and executing the programs on the RAM 5003. Further, the processing is started for each job after the receiving processing, described referring to FIG. 8 above, has finished.

First, in step S201, using the management table 9000, the control unit 5000 confirms whether the image data to be printed is held in either the RAM 5003 or the hard disk 5005. Next, in step S202, a bus interface 5012 outputs the image data to be printed to the printing unit 3000 via a bus 6000 from the storage unit, which was confirmed in step S201. The output of the image data to be printed in step S202 can also be performed by sending, via the network interface 5011, the image data to be printed to an external apparatus (not-illustrated), which is connected via the network 1003 to the multifunction peripheral 1000. Next, in step S203, the data transfer unit 5009 updates the management table 9000. Next, in step S204, if the image data, which was updated in the management table 9000 in step S203, is not image data of the final page (NO in step S204), the processing returns to step S201, while if the image data was of the final page (YES in step S204), the processing is finished.

According to the present exemplary embodiment, when determining the image data to be held in a memory (RAM, for example), the transfer time of the image data in the printing processing can be shortened, since the image data of the page having the maximum data size is held in the memory (RAM, for example).

The characteristic of the present exemplary embodiment is that, in the printing processing, if there has been image data read from the RAM, image data having the maximum data size among the image data stored in the hard disk is stored in a free space of the RAM.

The configuration of the multifunction peripheral 1000 according to a second exemplary embodiment is similar to the configuration according to the first exemplary embodiment (described above referring to FIGS. 1 to 7).

The job receiving processing in the multifunction peripheral 1000 according to the second exemplary embodiment is similar to the processing according to the first exemplary embodiment (described referring to FIG. 8).

The receiving processing of image data in the multifunction peripheral 1000 according to the second exemplary embodiment of the present invention will now be described referring to FIGS. 16 to 22.

Figure 16:
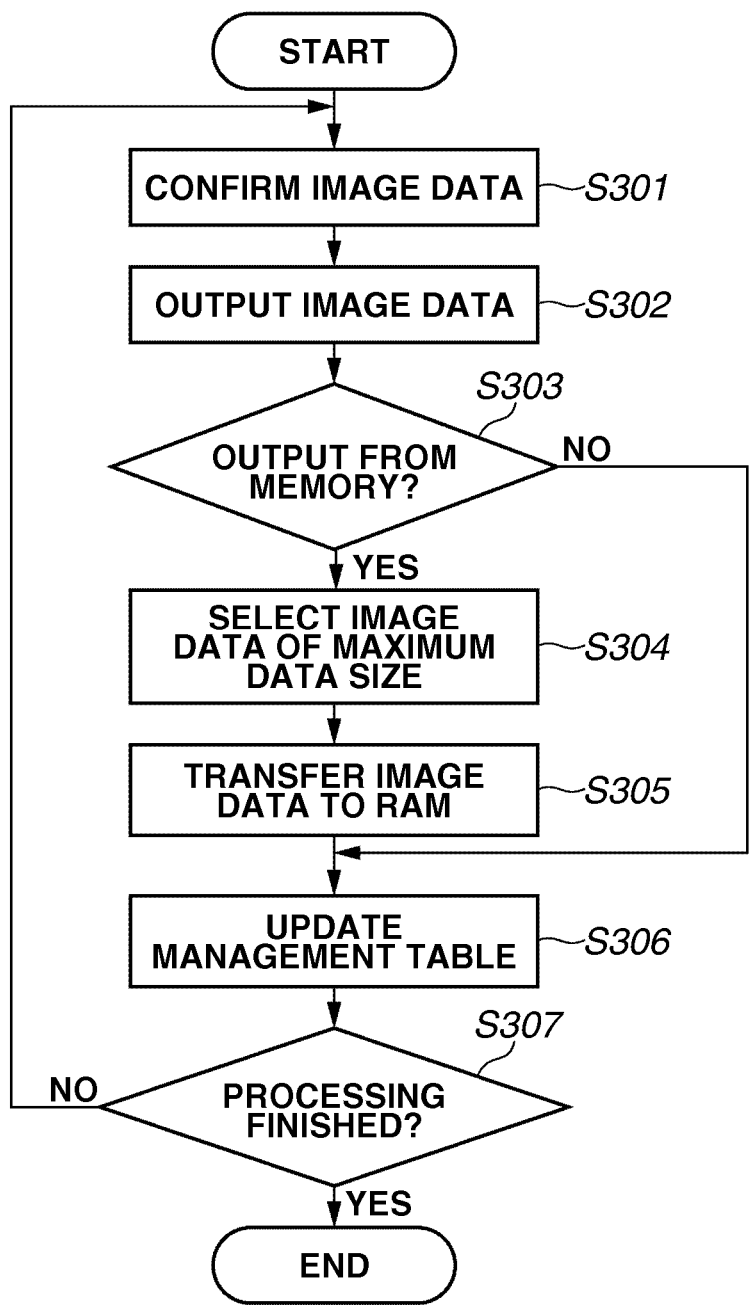
FIG. 16 is a flowchart illustrating the printing processing of image data in the multifunction peripheral according to the first exemplary embodiment.

FIG. 16 is a flowchart illustrating the printing processing of the image data in the multifunction peripheral 1000 according to the second exemplary embodiment of the present invention. In the multifunction peripheral 1000, the CPU 5001 realizes this processing by reading programs stored in the hard disk 5005 and executing the programs on the RAM 5003. Further, the processing is started for each job after the receiving processing described referring to FIG. 8 has finished.

First, in step S301, using the management table 9000, the control unit 5000 confirms whether the image data to be printed is held in either the RAM 5003 or the hard disk 5005. Next, in step S302, the bus interface 5012 outputs the image data to be printed to the printing unit 3000 via the bus 6000 from the storage unit, which was confirmed in step S301. The output of the image data to be printed in step S302 can also be performed by sending, via the network interface 5011, the image data to be printed to an external (not-illustrated) apparatus, which is connected via the network 1003 to the multifunction peripheral 1000. Next, in step S303, using the management table 9000, the control unit 5000 determines whether the output of the image data in step S302 is output from the RAM 5003. This determination can be performed by using the RAM capacity detection unit 5008 to detect remaining amount in the RAM 5003. As a result of the output of the image data in step S302, if the remaining amount of the RAM 5003 increased, this means that the output of the image data in step S302 is output from the RAM 5003. If the output of the image data in step S302 is output from the RAM 5003 (YES in step S303), the processing proceeds to step S304. If the transfer of the image data in step S302 is not a transfer from the RAM 5003 (NO in step S303), the processing proceeds to step S306.

Figure 17:
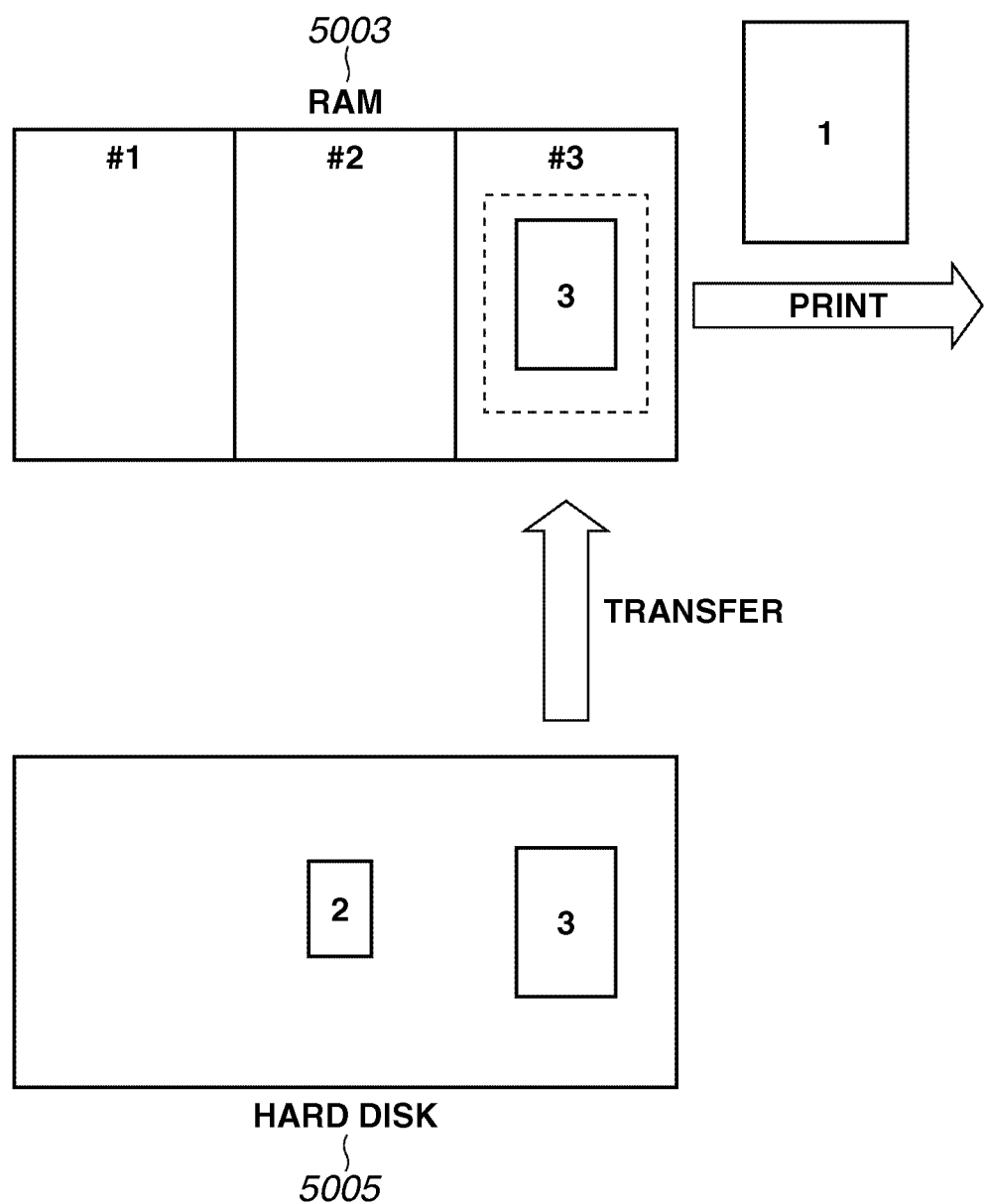
FIG. 17 is a diagram illustrating the printing processing of the first page image data in the printing processing of image data in the multifunction peripheral according to the first exemplary embodiment.

If the transfer of the image data in step S302 is a transfer from the RAM 5003 (YES in step S303), as illustrated in FIG. 17, the image data having the maximum data size among the image data held in the hard disk 5005 is transferred to the RAM 5003. Here, this processing may also be performed so that the image data having the earliest processing order among the image data held in the hard disk 5005 is transferred to the RAM 5003. Then, the following processing is performed. First, in step S304, the data transfer unit 5009, using the management table 9000, determines the image data having the maximum data size among the image data held in the hard disk 5005. Next, in step S305, the image data determined in step S304 is transferred from the hard disk 5005 to the RAM 5003. Next, in step S306, the data transfer unit 5009 updates the management table 9000. FIG. 18 is a diagram illustrating the management table 9000 before the updating in step S306 is performed. FIG. 19 is a diagram illustrating the management table 9000 after the updating in step S306 is performed. Comparing FIGS. 18 and 19, it can be seen that after the updating, the status 9005 of the first page is changed from S to P, the start address 9012 of the third page is updated to an address in the RAM 5003, and the pointer 9014 of the third page is changed from HDD to MEM. Next, in step S307, if the image data updated in the management table 9000 in step S306 is not image data of the final page (NO in step S307), the processing returns to step S301, while if the image data is of the final page (YES in step S307), the processing is finished.

Figure 22:
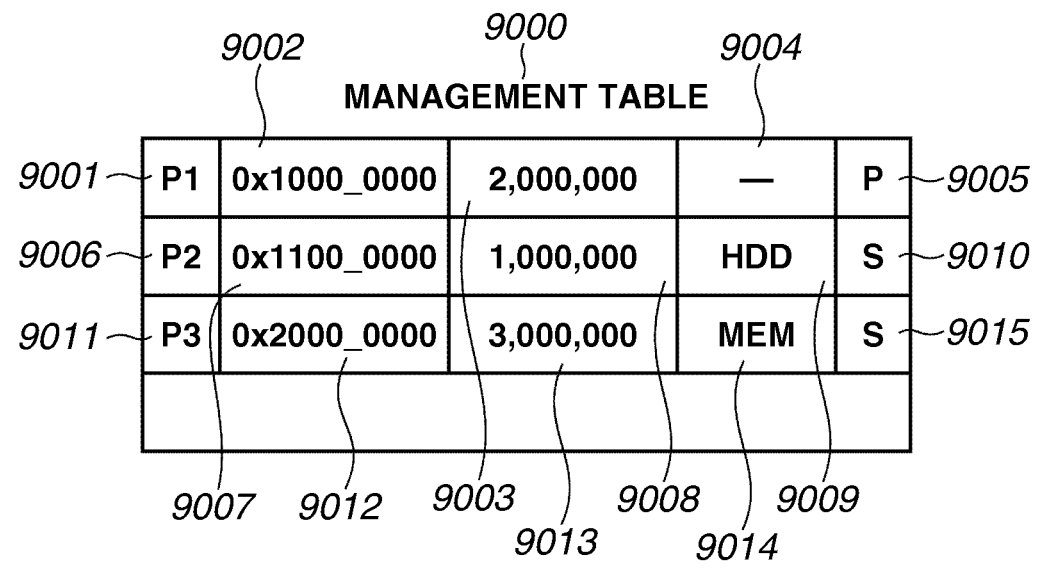

If the transfer of the image data in step S302 is not a transfer from the memory (NO in step S303), as illustrated in FIG. 20, the image data held in the hard disk 5005 is not changed. Then, the following processing is performed. First, in step S306, the data transfer unit 5009 updates the management table 9000. FIG. 21 is a diagram illustrating the management table 9000 before the updating in step S306 is performed. FIG. 22 is a diagram illustrating the management table 9000 after the updating in step S306 is performed. Comparing FIGS. 21 and 22, it can be seen that after the updating, the status 9005 of the first page is changed from S to P, while the management information of the other pages is unchanged. Next, in step S307, if the image data updated in the management table 9000 in step S306 is not image data of the final page (NO in step S307), the processing returns to step S301, while if the image data was of the final page (YES in step S307), the processing is finished.

According to the present exemplary embodiment, in printing, the printing processing of the image data can be performed faster, since when there is remaining amount in the memory (RAM, for example), the pages of image data having a large data size are transferred to the memory (RAM, for example).

The feature of the present exemplary embodiment is that the number of buffers on the RAM used in the receiving processing of the image data is changed according to the presence of printing processing of the image data.

The configuration of the apparatus according to a third exemplary embodiment is similar to the configuration of the apparatus according to the first exemplary embodiment (described above referring to FIGS. 1 to 7).

The job receiving processing in the multifunction peripheral 1000 according to the third exemplary embodiment is similar to the processing according to the first exemplary embodiment (described before referring to FIG. 8).

The printing processing of image data in the multifunction peripheral 1000 according to the third exemplary embodiment of the present invention is similar to the processing according to the first exemplary embodiment (described above referring to FIG. 9).

Figure 23:
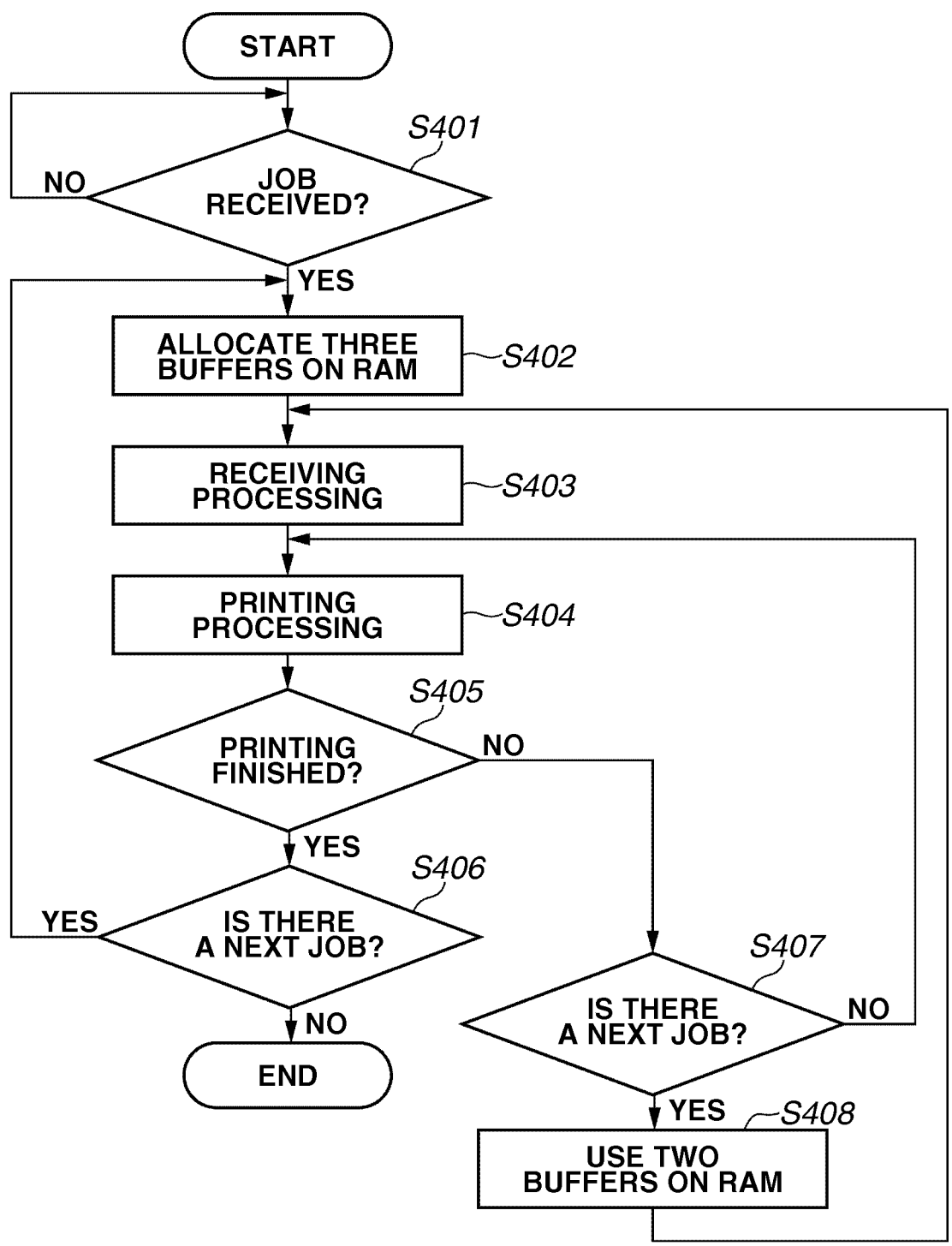
FIG. 23 is a flowchart illustrating a method for utilizing buffers on a RAM when the multifunction peripheral performs image data receiving processing and printing processing according to a third exemplary embodiment.

FIG. 23 is a flowchart illustrating a method for utilizing the buffers on the RAM 5003 in the multifunction peripheral 1000 according to the third exemplary embodiment. In the multifunction peripheral 1000, the CPU 5001 realizes this processing by reading the programs stored in the hard disk 5005 and executing the programs on the RAM 5003.

First, in step S401, the control unit 5000 waits for a job to be received (NO in step S401), and once a job is received (YES in step S401), the processing proceeds to step S402. Next, in step S402, three buffers on the RAM 5003 are allocated to the job receiving processing. Next, in step S403, using the three buffers on the RAM 5003, the control unit 5000 performs the job receiving processing described above referring to FIG. 8. When the job receiving processing is finished, the three buffers on the RAM 5003 are allocated to the printing processing of the image data (except for the case where the processing of step S403 is performed via step S408). Next, in step S404, using the three buffers on the RAM 5003, the control unit 5000 starts the printing processing of the image data described above referring to FIG. 9 (except for the case where the processing of step S403 is performed via step S408). Next, in step S405, the control unit 5000 determines whether the printing processing started in step S404 is finished.

In step S406, if it is determined in step S405 that the printing processing is finished (YES in step S405), the control unit 5000 determines whether a next job has been received. If it is determined in step S406 that a next job is received (YES in step S406), the processing returns to step S402. If it was determined in step S406 that a next job is not received (NO in step S406), the processing is finished.

In step S407, if it is determined in step S405 that the printing processing is not finished (NO in step S405), the control unit 5000 determines whether a next job is received.

In step S408, if it is determined in step S407 that a next job is received (YES in step S407), two of the buffers on the RAM 5003 are allocated to the job receiving processing, one of the buffers is allocated to the job printing processing, and the processing returns to step S403. This buffer allocation state continues until it is determined in step S405 that the printing processing is finished (YES in step S405). Then, in step S403, job receiving processing using two buffers is performed, and in step S404, printing processing of the image data using one buffer is performed.

If it is determined in step S407 that a next job is not received (NO in step S407), the processing returns to step S404.

According to the present exemplary embodiment, the job receiving processing and the image data printing processing can be performed faster by changing the number of buffers on the RAM used in the receiving processing of the image data according to the presence of printing processing of the image data.

The feature of a fourth exemplary embodiment is in using a threshold when determining the image data to be held in the memory in job receiving processing. The image data of the page that exceeds the threshold first is held in the memory, and the comparison and replacement of that image data with the image data of subsequent pages are not performed.

The configuration of the apparatus according to the fourth exemplary embodiment is similar to the configuration of the apparatus according to the first exemplary embodiment (described above referring to FIGS. 1 to 7).

The printing processing of image data in the multifunction peripheral 1000 according to the fourth exemplary embodiment of the present invention is similar to the processing according to the first exemplary embodiment (described above referring to FIG. 9).

Figure 24:
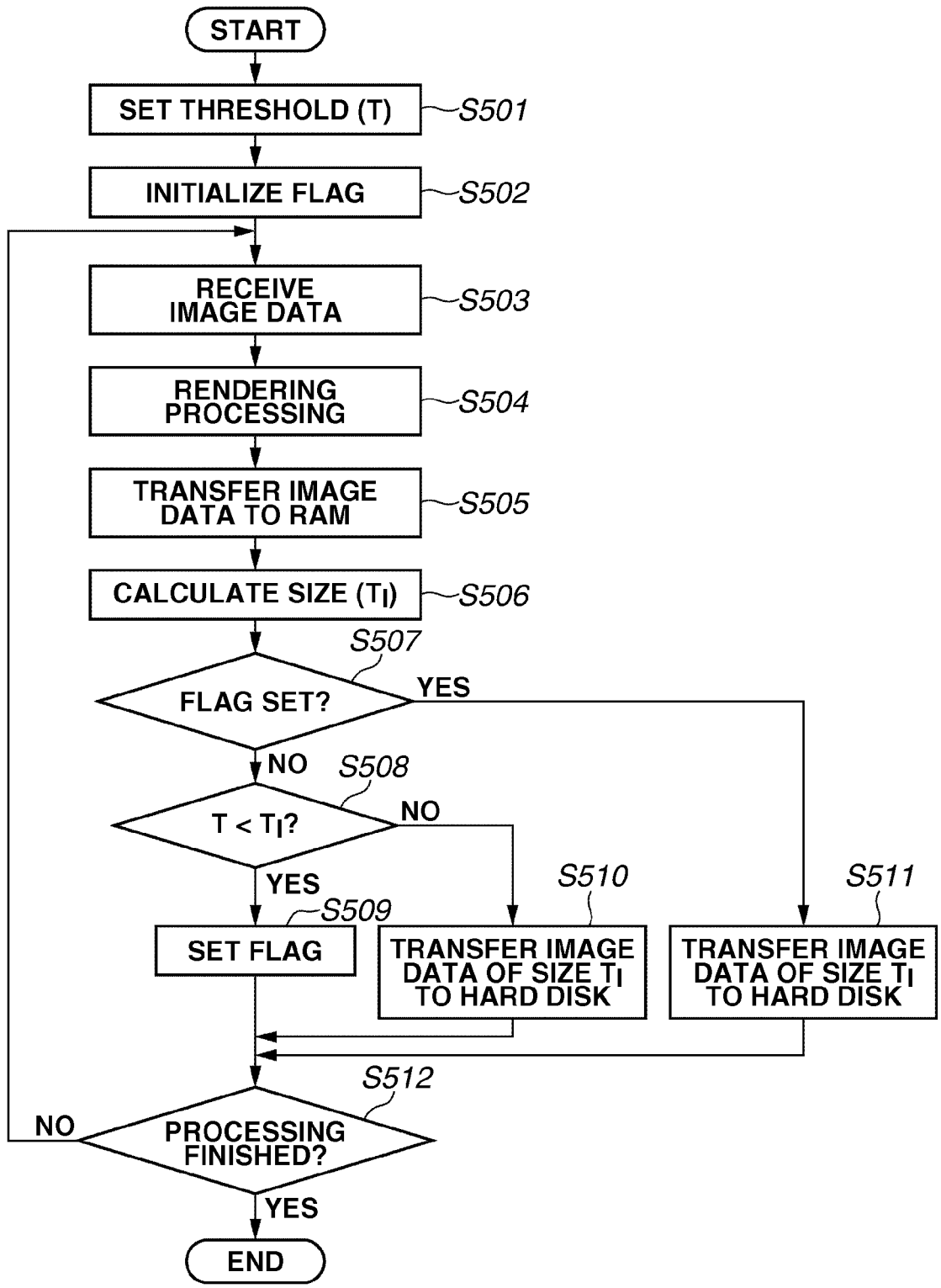
FIG. 24 is a flowchart illustrating processing when receiving image data in the multifunction peripheral according to a fourth exemplary embodiment of the present invention.

FIG. 24 is a flowchart illustrating the job receiving processing in the multifunction peripheral 1000 according to the fourth exemplary embodiment. First, in step S501, the control unit 5000 sets a threshold T of the size of the image data to be held in the RAM 5003. Next, in step S502, the control unit 5000 initializes a flag, which indicates whether the first page image data is held on the RAM 5003. Next, in step S403, the network interface 5011 receives a job. Next, in step S504, the image processing unit 5002 performs rendering processing on the image data contained in the job received in step S503. Next, in step S505, the data transfer unit 5009 transfers the image data, which has undergone rendering processing in step S504, to the RAM 5003. Next, in step S506, the data size determination unit 5006 determines the data size TI of the image data transferred in step S505 to the RAM 5003. Next, in step S507, the control unit 5000 determines whether the flag is set. If it is determined in step S507 that the flag is not set (NO in step S507), the processing proceeds to step S508. If it was determined in step S507 that the flag is set (YES in step S507), the processing proceeds to step S511.

If it was determined in step S507 that the flag is not set (NO in step S507), in step S508, the control unit 5000 compares the threshold T and the image data size TI. If in step S508 the image data size TI is greater than the threshold T (YES in step S508), the processing proceeds to step S509. If in step S508 the image data size TI is not greater than the threshold T (NO in step S508), the processing proceeds to step S510.

In step S509, if in step S508 the image data size TI is greater than the threshold T (YES in step S508), the control unit 5000 sets the flag.

In step S510, if in step S508 the image data size TI is not greater than the threshold T (NO in step S508), the data transfer unit 5009 transfers the image data of data size TI to the hard disk 5005.

If it is determined in step S507 that the flag is set (YES in step S507), in step S511, the data transfer unit 5009 transfers the image data of data size TI to the hard disk 5005.

In step S512, after step S509, step S510, or step S511, the control unit 5000 determines whether the job receiving processing is finished. If the job receiving processing is not finished in step S512 (NO in step S512), the processing returns to step S503, and the job receiving processing continues. If the job receiving processing is finished in step S512 (YES in step S512), the control unit 5000 finishes the job receiving processing.

According to the present exemplary embodiment, the job receiving processing can be performed faster by holding the page of the image data which exceed the threshold first in the memory (RAM, for example) when determining the image data to be held in the memory (RAM, for example).

The feature of a fifth exemplary embodiment is that one buffer, which can hold a plurality of pieces of image data in a memory, is prepared, and that as many pieces of the image data as the remaining amount permits are held in the memory.

The configuration of the apparatus according to the fifth exemplary embodiment is similar to the configuration of the apparatus according to the first exemplary embodiment (described above referring to FIGS. 1 to 7).

The printing processing of image data in the multifunction peripheral 1000 according to the fifth exemplary embodiment is similar to the processing according to the first exemplary embodiment (described above referring to FIG. 9).

Figure 25:
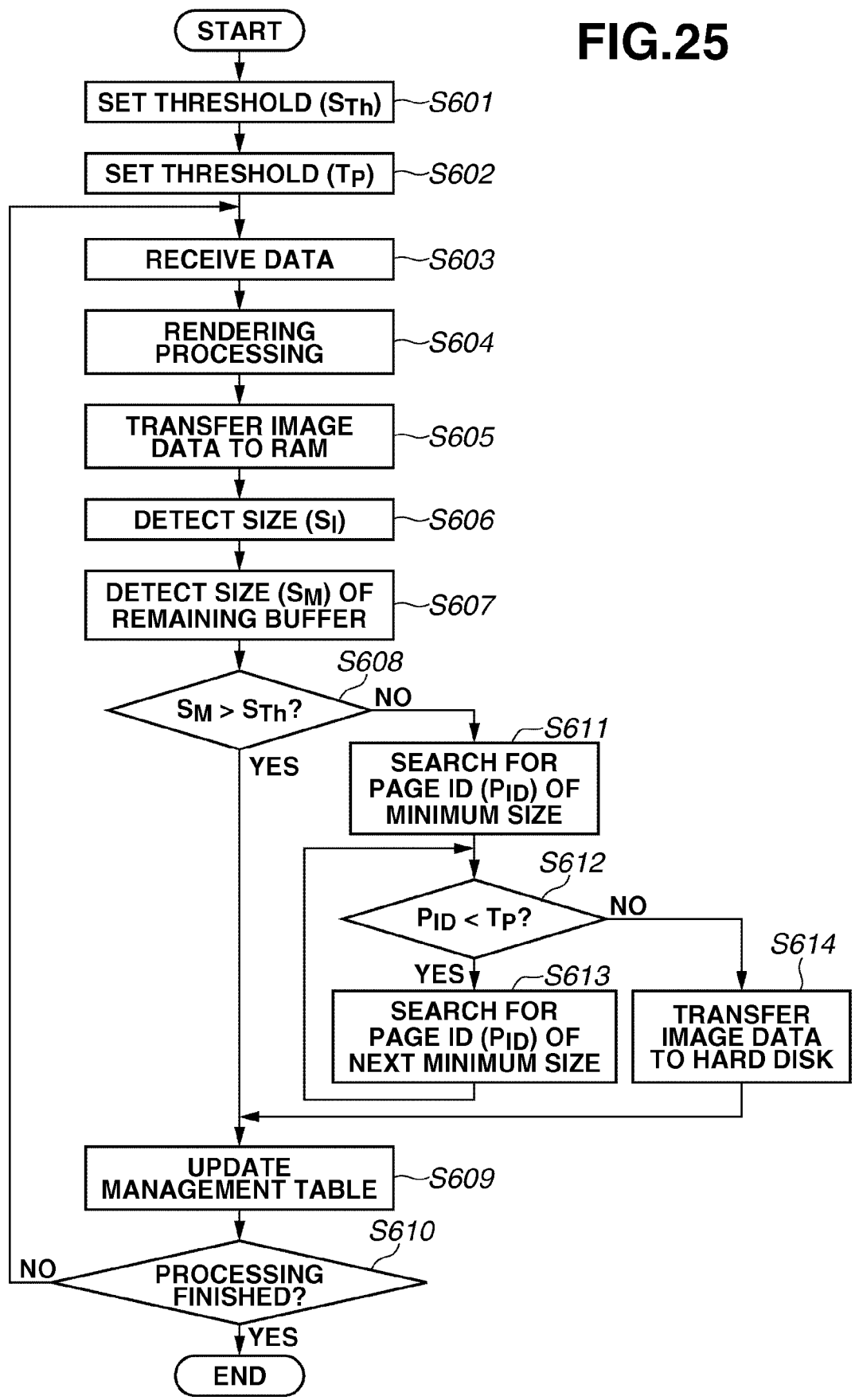
FIG. 25 is a flowchart illustrating image data receiving processing in the multifunction peripheral according to a fifth exemplary embodiment of the present invention.

FIG. 25 is a flowchart illustrating the job receiving processing in the multifunction peripheral 1000 according to the fifth exemplary embodiment of the present invention. In the multifunction peripheral 1000, the CPU 5001 realizes this processing by reading programs stored in the hard disk 5005 and executing the programs on the RAM 5003.

First, in step S601, the control unit 5000 sets a threshold STh of the remaining amount of the buffer on the RAM 5003. Next, in step S602, the control unit 5000 sets a threshold TP of the number of pages of the image data to be held in the buffer on the RAM 5003. Next, in step S603, the network interface 5011 receives a job. Next, in step S604, the image processing unit 5002 performs rendering processing on the image data contained in the job received in step S603. Next, in step S605, the data transfer unit 5009 transfers the image data, which has undergone rendering processing in step S604, to the buffer on the RAM 5003. Next, in step S606, the data size determination unit 5006 determines the data size SI of the image data transferred in step S605 to the RAM 5003. Next, in step S607, the control unit 5000 detects the remaining amount SM of the buffer on the RAM 5003. Next, in step S608, the control unit 5000 determines whether the remaining amount SM of the buffer detected in step S607 is greater than the remaining amount threshold STh set in step S601. If it is determined in step S608 that the remaining amount SM of the buffer is greater than the remaining amount threshold STh (YES in step S608), the processing proceeds to step S609. If it is determined, in step S608, that the remaining amount SM of the buffer is not greater than the remaining amount threshold STh (NO in step S608), the processing proceeds to step S611.

If in step S608 the remaining amount SM of the buffer is not greater than the remaining amount threshold STh (NO in step S608), in step S611, the control unit 5000 searches for the page ID (PID) of the minimum size. Next, in step S612, the data processing order determination unit 5007 determines whether the PID searched for in step S611 is smaller than the threshold TP set in step S602.

If it is determined in step S612 that the PID searched for by the data processing order determination unit 5007 is smaller than the threshold TP (YES in step S612), in step S613, the control unit 5000 searches for the page ID (PID) of the page having the next minimum size, and the processing returns to step S612.

If it is determined in step S612 that the PID searched for by the data processing order determination unit 5007 is not smaller than the threshold TP (NO in step S612), in step S614, the control unit 5000 transfers the searched image data to the hard disk 5005.

Figure 26:
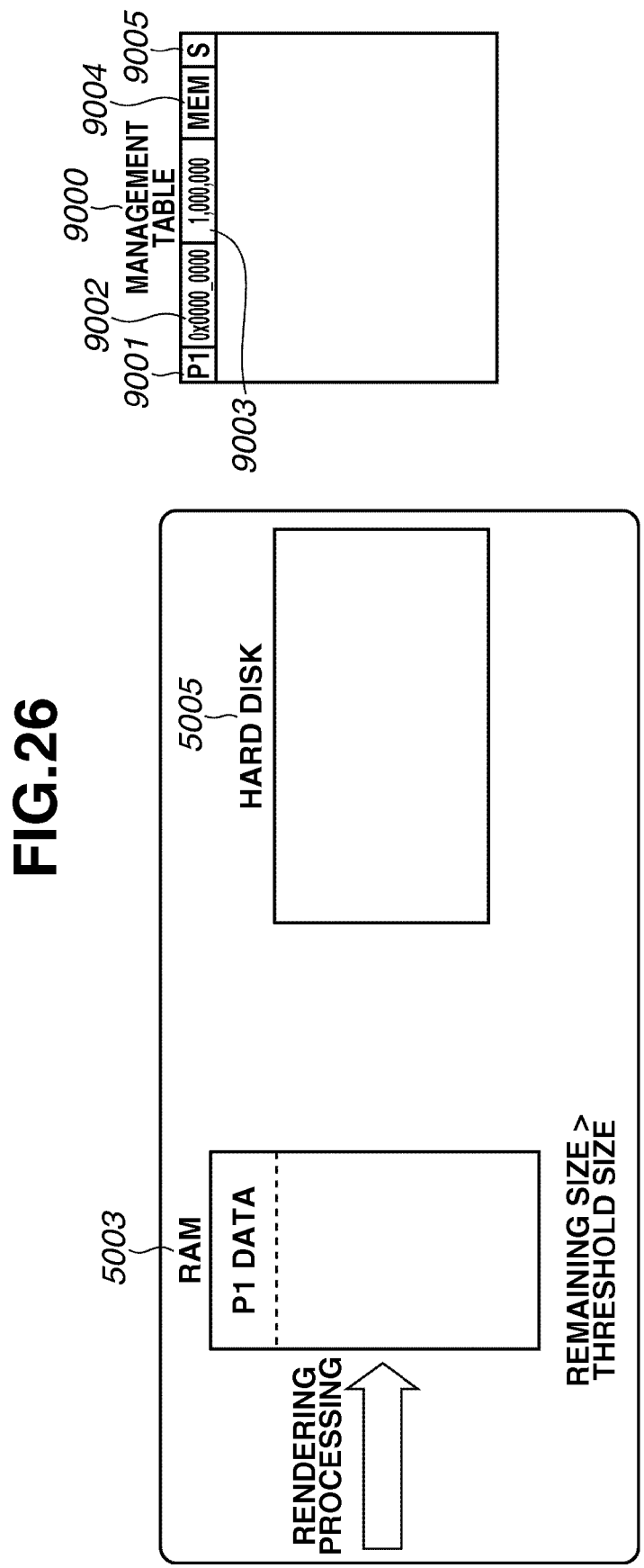
FIG. 26 is a diagram illustrating the printing processing of first page image data in the receiving processing of image data in the multifunction peripheral according to the fifth exemplary embodiment.

In step S609, the data transfer unit 5009 updates the management table 9000 if in step S608 the remaining amount SM of the buffer is greater than the remaining amount threshold STh, or after the processing of step S614. Next, in step S610, the control unit 5000 determines whether the job receiving processing is finished. If the job receiving processing is not finished (NO in step S610), the processing returns to step S603, and the job receiving processing continues. If the job receiving processing is finished (YES in step S610), the control unit 5000 finishes the job receiving processing. FIG. 26 is a diagram illustrating a state where first page image data, which has undergone rendering processing, is held in the RAM 5003, and the management table 9000. In page ID 9001, P1, which is an ID indicating that the image data is of a first page, is registered. In start address 9002, the start address 0x0000_0000, which indicates the location where the first page image data is held, is registered. In data size 9003, 1 Mbyte, which is the data size of the first page, is registered. In pointer 9004, MEM, which represents RAM 5003, is registered as a pointer indicating the location where the first page image data is held. In status 9005, S (spool), which indicates a print waiting state as the status of the first page image data, is registered.

Figure 27:
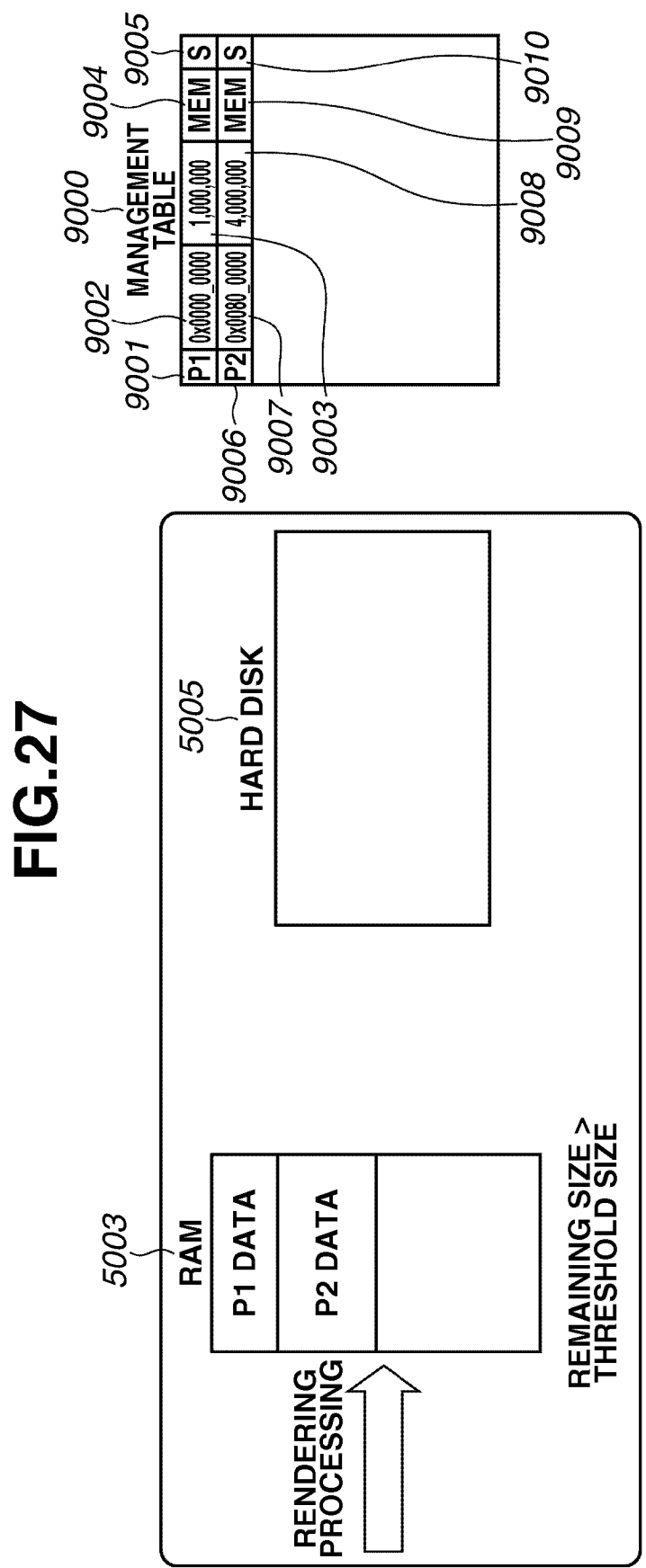
FIG. 27 is a diagram illustrating the receiving processing of second page image data in the printing processing of image data in the multifunction peripheral according to the fifth exemplary embodiment.

FIG. 27 is a diagram illustrating a state where second page image data, which has newly undergone rendering processing, is held in the RAM 5003, and the management table 9000. In page ID 9006, P2, which is an ID indicating that the image data is of a second page, is registered. In start address 9007, the start address 0x0080_0000, which indicates the location where the second page image data is held, is registered. In data size 9008, 4 Mbytes, which is the data size of the second page, is registered. In pointer 9009, MEM, which represents RAM 5003, is registered as a pointer indicating the location where the second page image data is held. In status 9010, S (spool), which indicates a print waiting state as the status of the second page image data, is registered.

Figure 28:
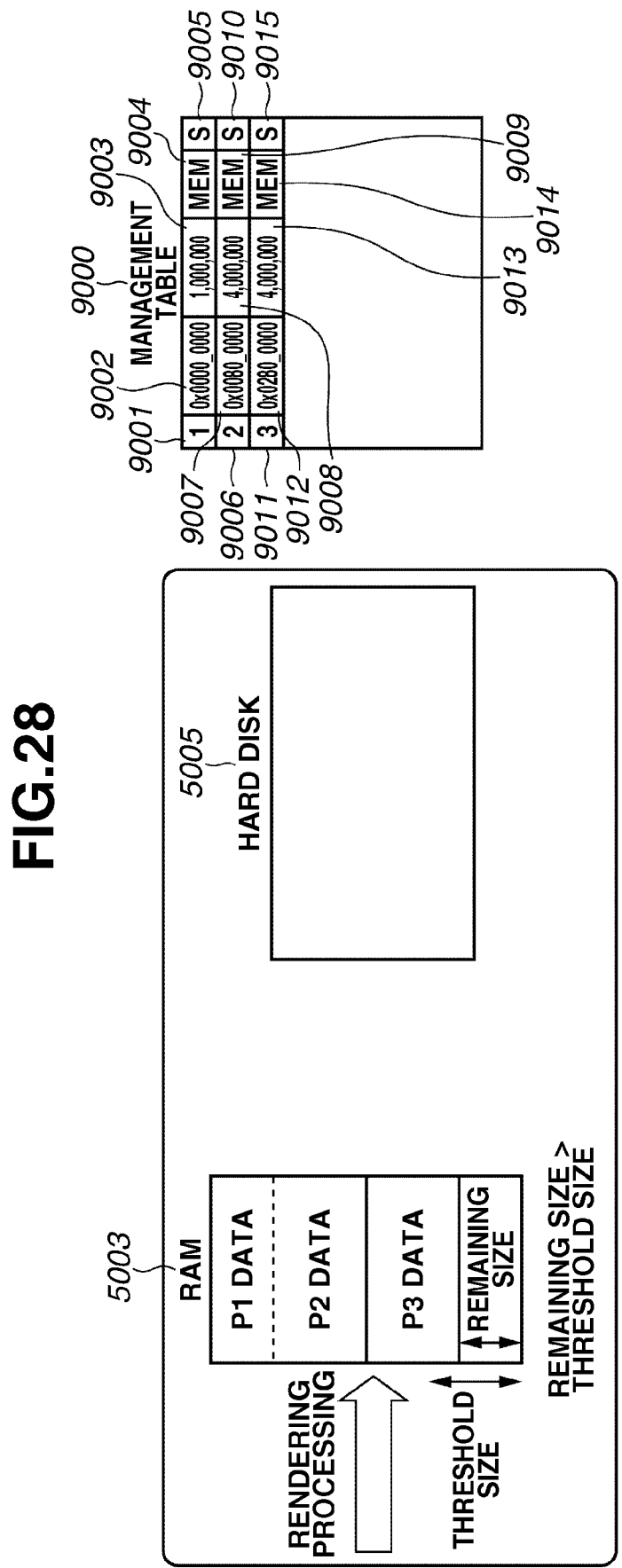
FIG. 28 is a diagram illustrating the receiving processing of third page image data in the printing processing of image data in the multifunction peripheral according to the fifth exemplary embodiment.

FIG. 28 is a diagram illustrating a state where third page image data, which has newly undergone rendering processing, is held in the RAM 5003, and the management table 9000. In page ID 9011, P3, which is an ID indicating that the image data is of a third page, is registered. In start address 9012, the start address 0x0280_0000, which indicates the location where the third page image data is held, is registered. In data size 9013, 4 Mbytes, which is the data size of the third page, is registered. In pointer 9014, MEM, which represents RAM 5003, is registered as a pointer indicating the location where the third page image data is held. In status 9015, S (spool), which indicates a print waiting state as the status of the third page image data, is registered.

Figure 29:
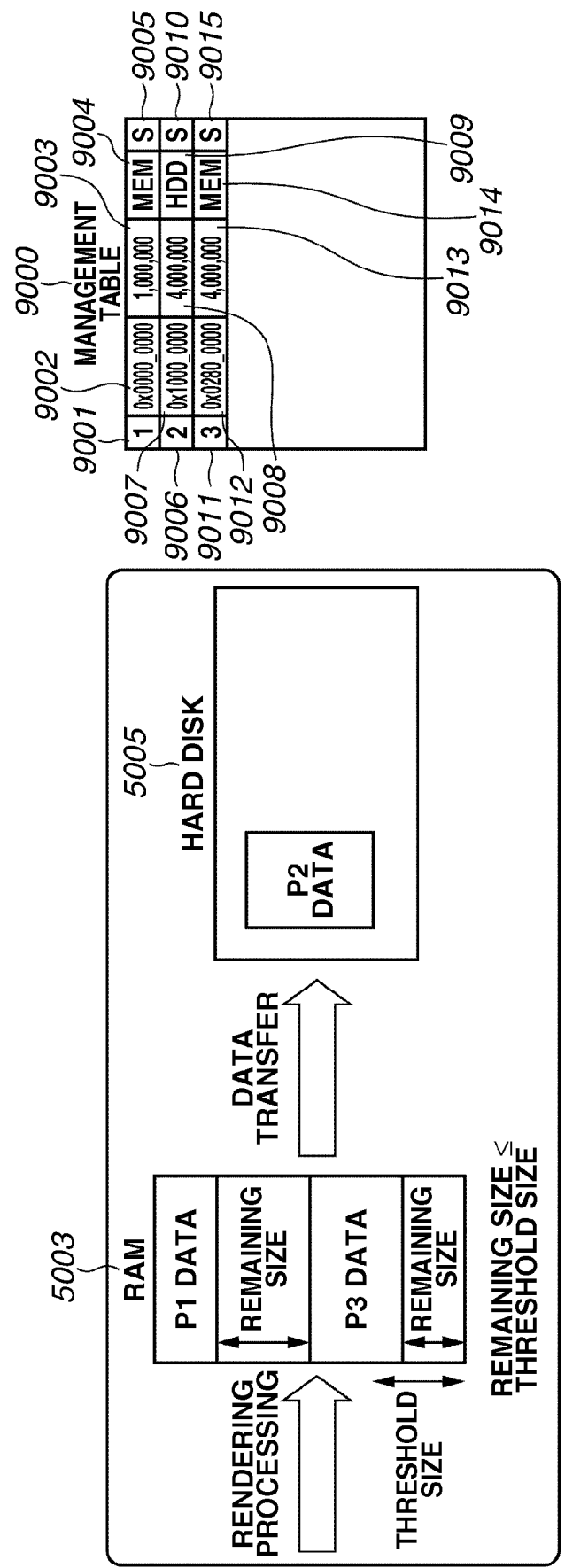
FIG. 29 is an image data management table of after the receiving processing of the third page image data in the receiving processing of image data in the multifunction peripheral according to the fifth exemplary embodiment.

FIG. 29 is a diagram illustrating a state where the second page image data, which has been already held in the RAM 5003, is transferred to the hard disk 5005, and the management table 9000. FIG. 29 illustrates the case where the threshold TP according to the fifth exemplary embodiment is set to be TP=2. The start address 9007 of the second page image data is updated to 0x1000_0000. The pointer 9009 of the second page is updated to HDD, which represents the hard disk 5005, as the pointer indicating the location where the image data is held.

Figure 30:
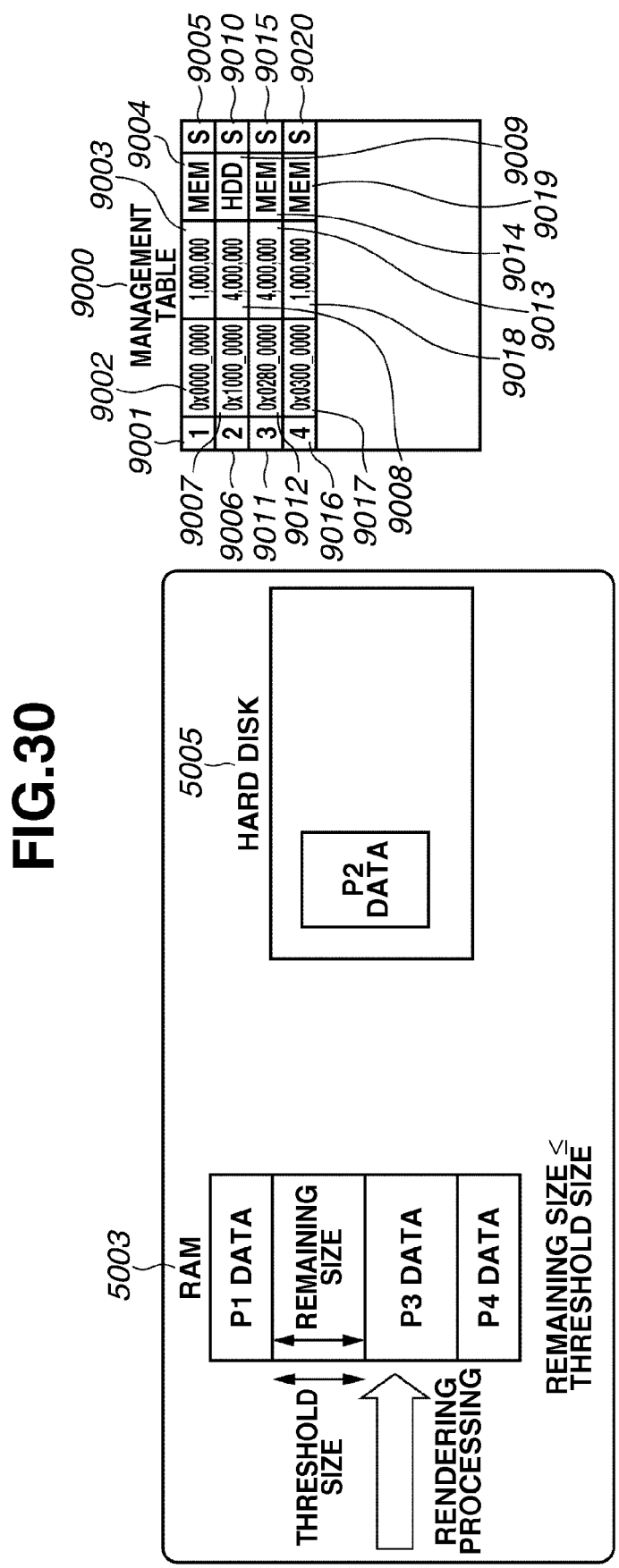
FIG. 30 is a diagram illustrating the receiving processing of fourth page image data in the receiving processing of image data in the multifunction peripheral according to the fifth exemplary embodiment.

FIG. 30 is a diagram illustrating a state where fourth page image data, which has newly undergone rendering processing, is held in the RAM 5003, and the management table 9000. In page ID 9016, P4, which is an ID indicating that the image data is of a fourth page, is registered. In start address 9017, the start address 0x0300_0000, which indicates the location where the fourth page image data is held, is registered. In data size 9018, 1 Mbyte, which is the data size of the fourth page, is registered. In pointer 9019, MEM, which represents RAM 5003, is registered as a pointer indicating the location where the fourth page image data is held. In status 9020, S (spool), which indicates a print waiting state as the status of the fourth page image data, is registered.

Figure 31:
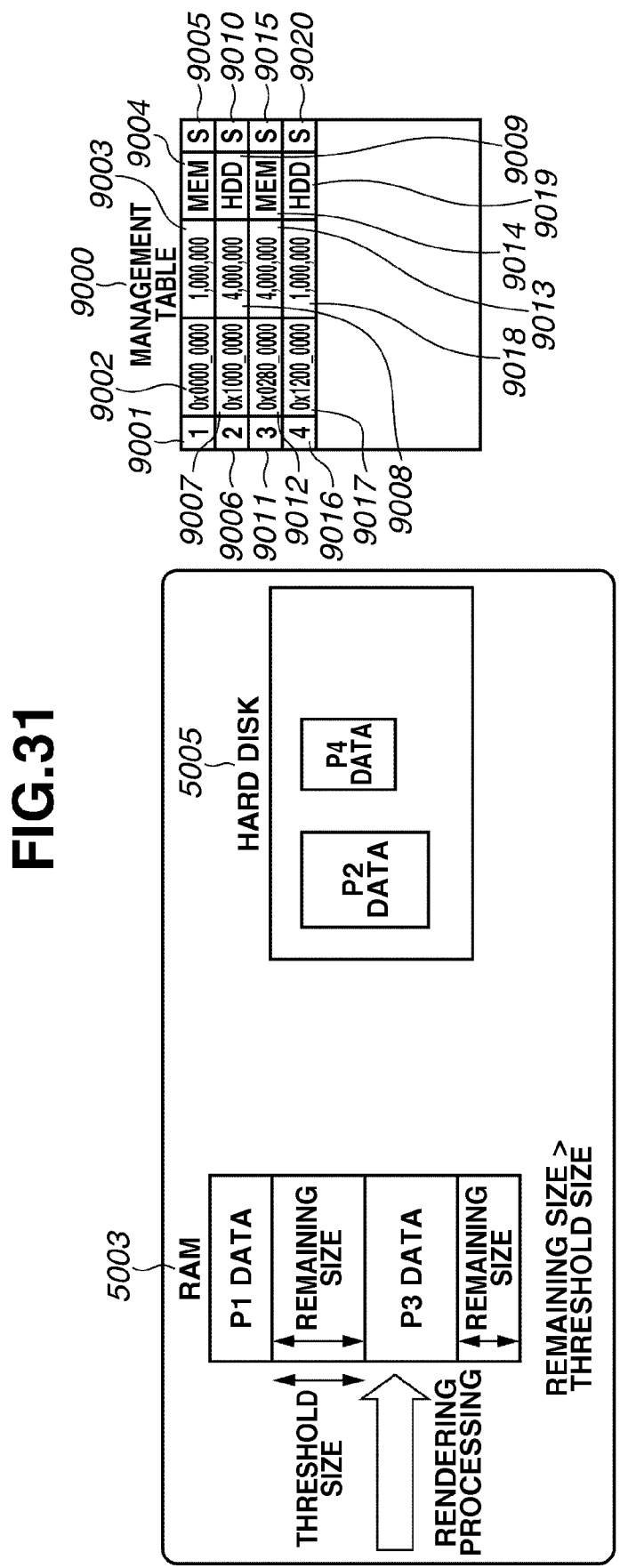
FIG. 31 is an image data management table of after the receiving processing of the fourth page image data in the receiving processing of image data in the multifunction peripheral according to the fifth exemplary embodiment.

FIG. 31 is a diagram illustrating a state where fourth page image data, which has been already held in the RAM 5003, is transferred to the hard disk 5005, and the management table 9000. FIG. 31 illustrates the case where the threshold TP according to the fifth exemplary embodiment is set to be TP=2. The start address 9017 of the fourth page image data is updated to 0x1200_0000. The pointer 9019 of the fourth page is updated to HDD, which represents the hard disk 5005, as the pointer indicating the location where the image data is held.

Figure 32:
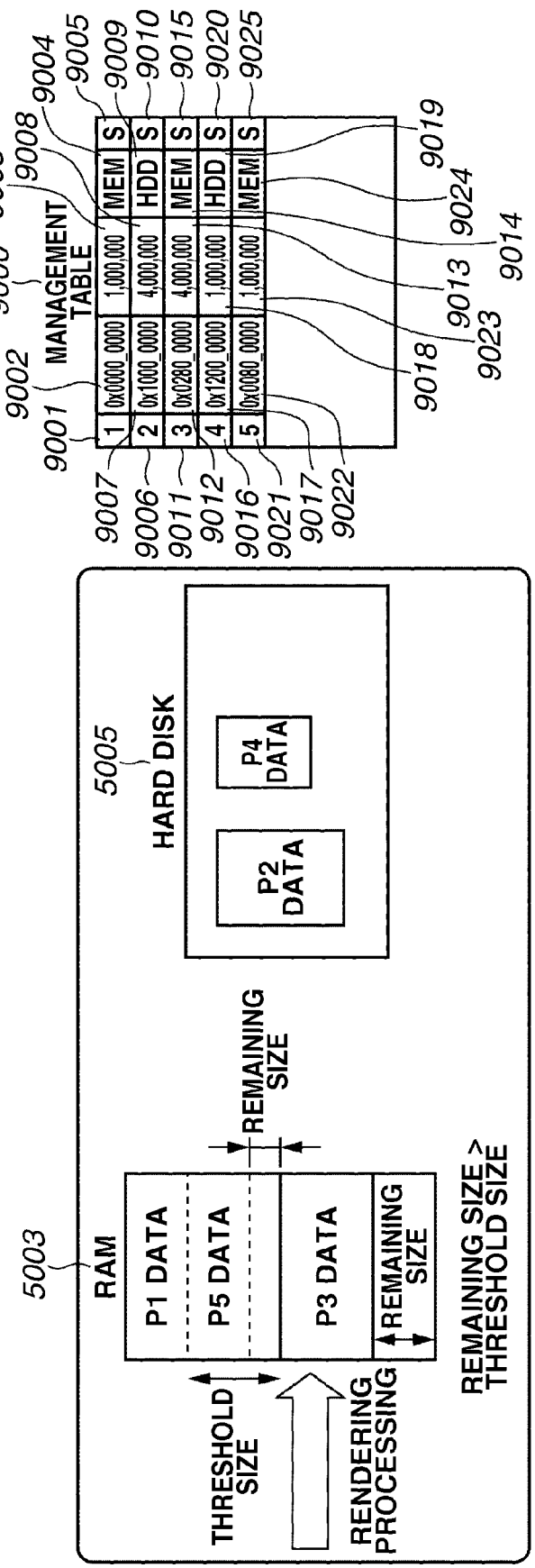
FIG. 32 is a diagram illustrating the receiving processing of fifth page image data in the receiving processing of image data in the multifunction peripheral according to the fifth exemplary embodiment.

FIG. 32 is a diagram illustrating a state where fifth page image data, which has newly undergone rendering processing, is held in the RAM 5003, and the management table 9000. In page ID 9021, P5, which is an ID indicating that the image data is of a fifth page, is registered. In start address 9022, the start address 0x0080_0000, which indicates the location where the fifth page image data is held, is registered. In data size 9023, 1 Mbyte, which is the data size of the fifth page, is registered. In pointer 9024, MEM, which represents RAM 5003, is registered as a pointer indicating the location where the fifth page image data is held. In status 9025, S (spool), which indicates a print waiting state as the status of the fifth page image data, is registered.

The fifth exemplary embodiment can also be configured as follows. In step S611, the searched for page ID can be set as the page ID of image data whose data size is smaller than the size SI of the image data transferred to the RAM 5003 in step S605. In this case, the page ID of the image data having the second smallest data size, or the page ID of the image data having the third smallest data size, for example, can be searched for. Further, in step S613, the page ID of image data whose data size is smaller than the size SI of the image data transferred to the RAM 5003 in step S605, and which is not yet searched for in step S611, can be searched for.

The present invention can also be achieved by reading and executing a software program which realizes the functions of the exemplary embodiments from the above-described system or apparatus.

In this case, the program (image processing program) itself, which is read from a storage medium, realizes the novel functions of the present invention. Therefore, that program and a recording medium storing the program also constitute the present invention.

Examples of recording media which can be used for supplying the program code include a floppy disk, a hard disk, a read only memory (ROM), an optical disk, a magneto optical disk, a compact disk ROM (CD-ROM), a digital versatile disk (DVD-ROM), a DVD-RAM, magnetic tape, memory card and the like.

Further, based on an instruction from the program, the OS or the like running on the computer may perform part or all of the actual processing, and from that processing the functions of the exemplary embodiments can be realized.

In addition, the present invention also includes cases where the program is written into a memory provided on a function expansion unit connected to a computer. A CPU provided on that function expansion unit then performs part or all of the actual processing, so that the functions of the exemplary embodiments are realized from that processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-330947 filed Dec. 21, 2007, which is hereby incorporated by reference herein in its entirety.

What is claimed is:

1. An image output apparatus including a first storage unit and a second storage unit that has a slower data access speed than the first storage unit, the image output apparatus comprising:
  an input unit inputs image data into the first storage unit after the image data has undergone rendering processing by an image processing unit;
  a control unit sets a first threshold of a remaining amount of the first storage and second threshold;
  a detection unit to detect the remaining amount of the first storage unit into which the image data input by the input unit is stored;
  a first determination unit determines whether the remaining amount of the first storage unit detected by the detection unit is smaller than the first threshold set by the control unit;
  a control unit to search for a page ID of the image data having a minimum data size, a processing order determination unit determines whether the page ID of the image data searched for has a data size smaller or larger than a second threshold, from among a plurality of image data stored in ascending order of the data size in the first storage unit;
  a control unit to, when the first determination unit determines that the remaining amount detected by the detection unit is smaller than the first threshold, transfer the image data found out by the control unit having a data size larger than the second threshold from the first storage unit to the second storage unit, and
  an output unit to output image data from the first storage unit or the second storage unit.

2. The image output apparatus according to claim 1, further comprising:
  a transfer unit configured to, when the output unit outputs image data from the first storage unit, transfer image data stored in the second storage unit to the first storage unit.

3. The image output apparatus according to claim 2, wherein the transfer unit transfers image data having a maximum data size among the a plurality of image data stored in the second storage unit.

4. The image output apparatus according to claim 1, wherein a storage capacity of the first storage unit is smaller than a storage capacity of the second storage unit.

5. The image output apparatus according to claim 1, wherein the control unit stores additional information indicating whether the image data is stored in either the first storage unit or the second storage unit and
  wherein the output unit outputs the image data unit based on the additional information.

6. The image output apparatus according to claim 1, wherein the output unit sends the image data unit to an external apparatus.

7. The image output apparatus according to claim 1, wherein the output unit prints the image data.

8. The image output apparatus according to claim 1, wherein the control unit transfers image data having a minimum data size among a plurality of image data stored in the first storage unit.

9. A method for controlling an image output apparatus including a first storage unit and a second storage unit which has a slower data access speed than the first storage unit, the method comprising:
  inputting image data into the first storage unit after the image data has undergone rendering processing;
  setting a first threshold of a remaining amount of the first storage unit and a second threshold;
  detecting the remaining amount of the first storage unit into which the input image data is stored;
  determining whether the detected remaining amount of the first storage unit is smaller than the set first threshold;
  searching for a page ID of the image data having a minimum data size, and determining whether the page ID of the image data searched for has a data size smaller or larger than a second threshold, from among a plurality of image data stored in ascending order of the data size in the first storage unit;
  when it is determined that the detected remaining amount is smaller than the set first threshold, transferring the image data found out by a control unit haying a data size larger than the second threshold from the first storage unit to the second storage unit; and
  outputting image data from the first storage unit or the second storage unit.

* * * * *